United States Patent
Ohno et al.

(10) Patent No.: US 9,712,699 B2
(45) Date of Patent: Jul. 18, 2017

(54) IMAGE PROCESSING APPARATUS, METHOD OF CONTROLLING THE SAME, INFORMATION PROCESSING APPARATUS, METHOD OF CONTROLLING THE SAME, AND STORAGE MEDIUM

(71) Applicant: Konica Minolta, Inc., Chiyoda-ku, Tokyo (JP)

(72) Inventors: Hiroyuki Ohno, Toyokawa (JP); Hiroaki Sugimoto, Nagoya (JP); Yoshikazu Takesada, Hyogo-ken (JP); Taketoshi Yamahata, Toyokawa (JP); Yusuke Shinosaki, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/943,816

(22) Filed: Nov. 17, 2015

(65) Prior Publication Data
US 2016/0142567 A1 May 19, 2016

(30) Foreign Application Priority Data
Nov. 18, 2014 (JP) ................. 2014-233746

(51) Int. Cl.
H04N 1/00 (2006.01)
H04N 1/32 (2006.01)
G06F 3/12 (2006.01)
G06K 15/02 (2006.01)

(52) U.S. Cl.
CPC ..... *H04N 1/00464* (2013.01); *H04N 1/00244* (2013.01); *H04N 1/00477* (2013.01)

(58) Field of Classification Search
None
See application file for complete search history.

(56) References Cited

U.S. PATENT DOCUMENTS

| | | | | |
|---|---|---|---|---|
| 2003/0179867 A1* | 9/2003 | Piepho | ............... | H04L 12/2856 379/90.01 |
| 2003/0182367 A1* | 9/2003 | Ohara | ................... | G06F 3/1204 709/203 |
| 2004/0131045 A1* | 7/2004 | Nabeshima | ......... | H04M 1/2471 370/351 |
| 2005/0228891 A1* | 10/2005 | Itoh | ........................ | H04L 12/24 709/228 |

(Continued)

FOREIGN PATENT DOCUMENTS

| | | |
|---|---|---|
| JP | 2003-058501 A | 2/2003 |
| JP | 2004-276542 A | 10/2004 |

*Primary Examiner* — Beniyam Menberu
(74) *Attorney, Agent, or Firm* — Buchanan Ingersoll & Rooney PC

(57) ABSTRACT

An image processing apparatus containing a web server is provided. The image processing apparatus regularly notifies a web browser of an operation instruction. When it is determined that setting processing of a set value for an operation of the image processing apparatus is attached, whether or not there is a set value saved on the web browser is checked. When it is confirmed that there is a set value saved on the web browser, the web browser is caused to transmit the set value to the image processing apparatus. When the set value transmitted from the web browser is reflected on the image processing apparatus, the set value saved on the web browser is deleted.

10 Claims, 17 Drawing Sheets

(56) References Cited

U.S. PATENT DOCUMENTS

| | | | |
|---|---|---|---|
| 2006/0095538 A1* | 5/2006 | Rehman | H04L 67/14 709/217 |
| 2008/0016189 A1* | 1/2008 | Yoo | H04L 12/2814 709/220 |
| 2009/0080014 A1* | 3/2009 | Kurokawa | G06F 21/6218 358/1.15 |
| 2010/0235642 A1* | 9/2010 | Ota | H04L 63/168 713/175 |
| 2010/0241967 A1* | 9/2010 | Lee | H04N 21/4104 715/744 |
| 2011/0154136 A1* | 6/2011 | Osuki | H04L 41/0253 714/57 |
| 2011/0228346 A1* | 9/2011 | Hoshino | H04N 1/32363 358/442 |
| 2012/0081735 A1* | 4/2012 | Matsuda | G06F 3/1203 358/1.14 |
| 2013/0208296 A1* | 8/2013 | Yoshida | G06K 15/02 358/1.14 |

* cited by examiner

IMAGE PROCESSING APPARATUS, METHOD OF CONTROLLING THE SAME, INFORMATION PROCESSING APPARATUS, METHOD OF CONTROLLING THE SAME, AND STORAGE MEDIUM

This application is based on Japanese Patent Application No. 2014-233746 filed with the Japan Patent Office on Nov. 18, 2014, the entire content of which is hereby incorporated by reference.

BACKGROUND OF THE INVENTION

Field of the Invention

The present disclosure relates to an image processing apparatus containing a web server and an information processing apparatus containing a web browser transmitting a set value to the image processing apparatus.

Description of the Related Art

In recent years, setting of an image processing apparatus has generally been operated from a web browser installed in a personal computer (PC) or a tablet terminal. In an operation for setting, for example, the web browser accepts input of a set value and requests of a web server contained in the image processing apparatus for setting of the set value.

Various techniques have been proposed for a method of operating setting in an image processing apparatus through a web browser. For example, Japanese Laid-Open Patent Publication No. 2004-276542 discloses a technique for converting a content of a request into a job and makes a registration as the job when a web server receives a request for change in setting from a web browser. According to the technique, the web server executes the setting registered as the job when a turn of the registered job comes.

Japanese Laid-Open Patent Publication No. 2003-058501 discloses a technique for temporarily saving a content input in a data input apparatus. According to the technique, when the data input apparatus is connected again to a server, the saved content is displayed on an input screen as a default. Thus, user's time and efforts for input of the same content can be saved.

When a request is received from the web browser, a web server attempts setting of a set value for an image processing apparatus. When the image processing apparatus is in a state that a set value cannot be set (for example, the image processing apparatus is executing a job), the request times out in the web server and the web server transmits an error to the web browser. The user of the web browser which has been notified of the error has had to perform again an operation for requesting the web server for setting of the set value. Namely, the user has had to perform a bothersome operation.

In this regard, according to the technique disclosed in Japanese Laid-Open Patent Publication No. 2004-276542, processing itself for converting a request for change in setting into a job may fail due to time-out in the web server. Therefore, the technique disclosed in Japanese Laid-Open Patent Publication No. 2004-276542 cannot overcome the bother described above in some cases.

According to the technique disclosed in Japanese Laid-Open Patent Publication No. 2003-058501, even though a set value is saved in the web browser, the user has eventually had to perform an operation for having the web browser request of a web server for change in setting after a state of the web server has been recovered. Therefore, the technique disclosed in Japanese Laid-Open Patent Publication No. 2004-276542 cannot overcome the bother described above either.

If setting for time-out should be eliminated in an image processing apparatus, a web browser could not obtain a response from a web server until setting of a set value in the image processing apparatus is completed. Therefore, the web browser could not perform next processing and a user who makes use of the web browser would have to wait until the image processing apparatus is in a state that a set value can be set. Thus, in a case that setting for time-out is eliminated in a web server as well, a situation inconvenient for a user will arise.

SUMMARY OF THE INVENTION

The present disclosure was made in view of such circumstances, and an object thereof is to improve convenience of a user when the user requests for setting of a set value through a web browser while an image processing apparatus is in a state that a set value cannot be set.

According to one aspect of the present disclosure, an image processing apparatus containing a web server is provided. The web server accepts setting processing of a set value for an operation of the image processing apparatus. The image processing apparatus includes a determination portion for determining whether or not the setting processing is to be accepted from a web browser, an operation instruction portion for instructing the web browser to save a set value input on the web browser on the web browser without allowing transmission of the set value to the image processing apparatus when the determination portion determines that the setting processing is not accepted and instructing the web browser to transmit the set value to the image processing apparatus when the determination portion determines that the setting processing is accepted, a holding checking portion for checking whether or not there is a set value saved on the web browser, a transmission instruction portion for instructing the web browser to transmit the set value saved on the web browser to the image processing apparatus, and a deletion instruction portion for instructing the web browser to delete the set value saved on the web browser. The operation instruction portion regularly notifies the web browser of an operation instruction. The holding checking portion checks whether or not there is a set value saved on the web browser when the determination portion determines that the setting processing is accepted. The transmission instruction portion has the web browser transmit the set value to the image processing apparatus when the holding checking portion confirms presence of the set value saved on the web browser. The deletion instruction portion has the set value saved on the web browser deleted when the set value transmitted from the web browser is reflected on the image processing apparatus.

According to another aspect of the present disclosure, a method of controlling an image processing apparatus containing a web server is provided. The web server accepts setting processing of a set value for an operation of the image processing apparatus from a web browser. The control method includes the steps of determining whether or not to accept the setting processing and regularly notifying the web browser of an operation instruction. The operation instruction indicates saving of the set value input on the web browser on the web browser without transmitting the set value to the image processing apparatus when it is determined that the setting processing is not accepted and indicates transmission of the set value to the image processing apparatus when it is determined that the setting processing is accepted. The control method further includes the steps of checking whether or not there is a set value saved on the web browser when it is determined that the setting processing is accepted, instructing the web browser to transmit the set value to the image processing apparatus when it is confirmed that there is a set value saved on the web browser, and indicating deletion of the set value saved on the web browser when the set value transmitted from the web browser is reflected on the image processing apparatus.

According to yet another aspect of the present disclosure, a non-transitory computer-readable storage medium storing a program for causing a computer of the image processing apparatus to perform the control method above is provided.

According to yet another aspect of the present disclosure, an information processing apparatus containing a web browser is provided. The information processing apparatus includes an acceptance portion accepting input of a set value for an operation of an image processing apparatus, a setting checking portion for checking whether or not the image processing apparatus accepts setting processing of the set value, a setting transmission portion for transmitting the set value to the image processing apparatus, a setting saving portion saving the set value on the web browser, a saving checking portion checking whether or not there is a set value saved on the web browser, and a deletion portion deleting the set value saved on the web browser. The setting checking portion checks whether or not the image processing apparatus accepts the setting processing when the set value of which input has been accepted by the acceptance portion is transmitted to the image processing apparatus. The setting saving portion saves the set value on the web browser without allowing the setting transmission portion to transmit the set value to the image processing apparatus when a result of checking by the setting checking portion indicates not accepting the setting processing. The setting transmission portion transmits the set value to the image processing apparatus when the result of checking by the setting checking portion indicates acceptance of the setting processing. The setting transmission portion transmits the set value to the image processing apparatus when the saving checking portion has confirmed saving of the set value, and the deletion portion deletes the set value saved on the web browser in response to reception of a notification of completion of setting of the set value from the image processing apparatus.

According to yet another aspect of the present disclosure, a method of controlling an information processing apparatus containing a web browser is provided. The control method includes the steps of accepting input of a set value for an operation of an image processing apparatus, checking whether or not the image processing apparatus accepts setting processing of the set value when the set value is transmitted to the image processing apparatus, saving the set value on the web browser without transmitting the set value to the image processing apparatus when a result of checking indicates not accepting the setting processing, transmitting the set value to the image processing apparatus when the result of the checking indicates acceptance of the setting processing, and deleting the set value saved on the web browser in response to reception of a notification of completion of setting of the transmitted set value from the image processing apparatus.

According to yet another aspect of the present disclosure, a non-transitory computer-readable storage medium storing a program for causing a computer of the image processing apparatus to perform the control method described above is provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
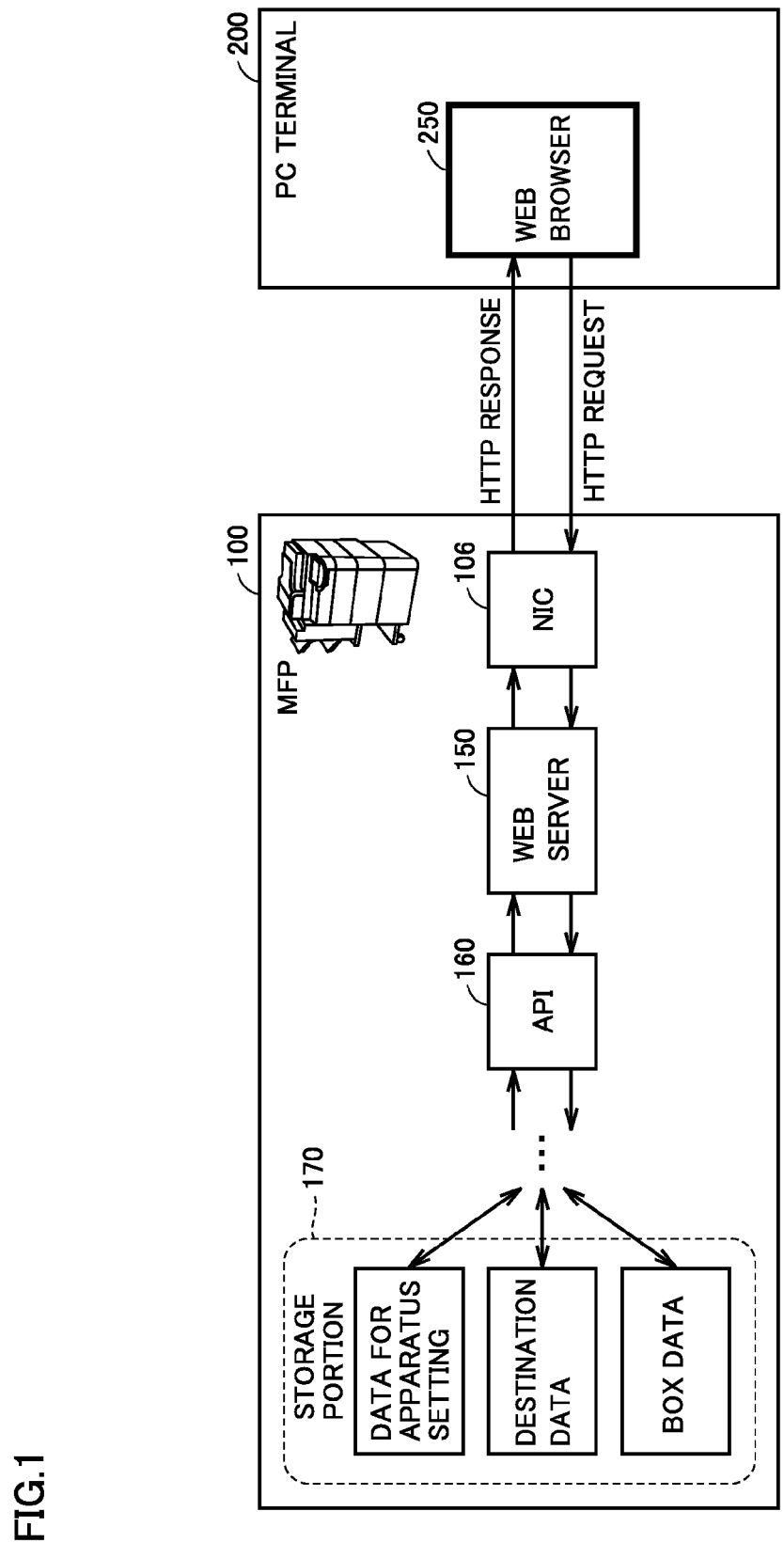
FIG. 1 is a diagram showing one example of a configuration of an image processing system including an image processing apparatus and an information processing apparatus according to a first embodiment.

An embodiment of an information processing apparatus will be described hereinafter with reference to the drawings. In the description below, the same elements and components have the same reference characters allotted. Their label and function are also identical. Therefore, description thereof will not be repeated.

First Embodiment

<Overview of Process in Image Processing System>

FIG. 1 is a diagram showing one example of a configuration of an image processing system including an image processing apparatus and an information processing apparatus according to a first embodiment. The image processing system includes an MFP 100 representing one embodiment of an image processing apparatus and a personal computer (PC) terminal 200 representing one embodiment of an information processing apparatus. In the image processing system, MFP 100 and PC terminal 200 are configured to be able to communicate.

MFP 100 includes a network interface card (NIC) 106 representing one example of a communication interface, a web server 150, an application programming interface (API) module 160, and a storage portion 170. PC terminal 200 includes a web browser 250. In the description below, API module 160 may simply be referred to as an "API 160."

In the image processing system, web browser 250 of PC terminal 200 accepts input of a set value for MFP 100 (for example, the upper limit of the number of printed copies for each user and a default value in setting for printing). Web browser 250 requests of web server 150 for setting of an input set value as an HTTP request.

In MFP 100, NIC 106 receives the HTTP request and passes received data (set value) to web server 150. Web server 150 sets the received data (set value) in MFP 100 by using API 160 to access data in storage portion 170 (data for setting an operation of MFP 100, destination data, or box data). As the setting is completed, web server 150 replies to web browser 250 as an HTTP response through NIC 106. Processing for setting a set value in MFP 100 is herein also called "processing for setting an operation of MFP 100."

When MFP 100 is in a state that a set value cannot be set (for example, during execution of a job) at the time when web browser 250 sends an HTTP request, web server 150 instructs web browser 250 to save the set value without sending the HTTP request.

Then, web server 150 instructs web browser 250 to transmit the saved set value when MFP 100 is in a state that the set value can be set.

<Hardware Configuration>

Figure 2:
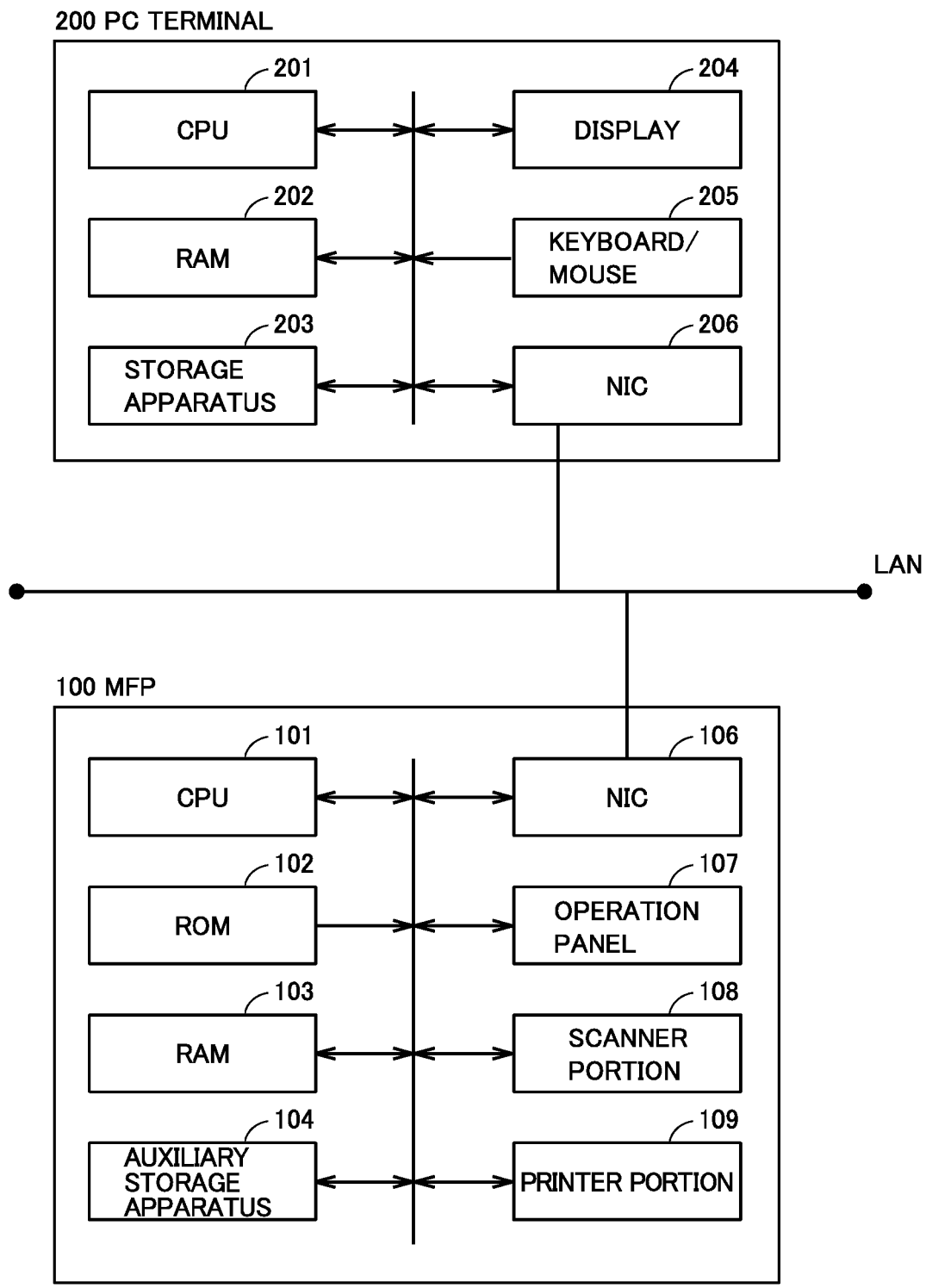
FIG. 2 is a diagram showing one example of a hardware configuration of a multi-functional peripheral (MFP) and a personal computer (PC) terminal included in the image processing system in the first embodiment.

FIG. 2 is a diagram showing one example of a hardware configuration of MFP 100 and PC terminal 200 included in the image processing system in the first embodiment. As shown in FIG. 2, MFP 100 communicates with PC terminal 200 through a network (local area network (LAN) in FIG. 2). A hardware configuration of each of MFP 100 and PC terminal 200 will be described below.

(MFP 100)

As shown in FIG. 2, MFP 100 includes, as main components, a central processing unit (CPU) 101, a read only memory (ROM) 102, a random access memory (RAM) 103, an auxiliary storage apparatus 104, network interface card (NIC) 106, an operation panel 107, a scanner portion 108, and a printer portion 109. CPU 101, ROM 102, RAM 103, auxiliary storage apparatus 104, NIC 106, operation panel 107, scanner portion 108, and printer portion 109 are connected to one another through an internal bus.

CPU 101 represents one example of a processor performing processing for centralized control of an operation of MFP 100.

ROM 102 stores various types of data including a program executed by CPU 101.

RAM 103 functions as a work area during execution of a program in CPU 101. RAM 103 may temporarily save image data read by scanner portion 108.

Auxiliary storage apparatus 104 saves various types of data such as destination information or a document registered in MFP 100. The data on a document may be input to MFP 100 through the network or may be generated as an image is read by scanner portion 108. Auxiliary storage apparatus 104 stores a set value transmitted from PC terminal 200. Thus, contents of setting defined by a set value input to web browser 250 of PC terminal 200 are reflected on MFP 100.

Operation panel 107 accepts input of various types of information such as a set value for image quality or paper for copying or information for registering or selecting a transmission destination (destination registration) of scanning. For example, a liquid crystal display portion on which a touch panel is stacked is provided on a surface of operation panel 107. Operation panel 107 displays, for example, contents of setting in MFP 100.

Scanner portion 108 scans a set document and generates image data of the document. Since a known method can be adopted as a method of generating image data in scanner portion 108, detailed description will not be repeated here.

Printer portion 109 is an apparatus for converting image data read by scanner portion 108 or print data transmitted from an external information processing apparatus such as PC terminal 200 into data for printing and printing an image of a document based on the resultant data, for example, with electrophotography. Since a known technique can be adopted for a manner of image formation such as electrophotography, detailed description will not be repeated here.

In MFP 100, CPU 101 functions as web server 150 by executing a server program. CPU 101 controls an operation of MFP 100 itself separately from a function as web server 150 by executing a predetermined program. At this point of view, CPU 101 functions as a control unit in MFP 100. CPU 101 as the control unit can detect a state of various elements within MFP 100 such as scanner portion 108 and printer portion 109. Then, CPU 101 detects, for example, whether or not scanner portion 108 and printer portion 109 are executing a job, a paper jam occurs in printer portion 109, or a user has logged in a network system as a manager through operation panel 107, to thereby determine whether or not MFP 100 is in a state that a new set value cannot be set.

(PC Terminal 200)

PC terminal 200 includes, as main components, a CPU 201, a RAM 202, a storage apparatus 203, a display 204, a keyboard/mouse 205, and an NIC 206. CPU 201, RAM 202, storage apparatus 203, display 204, keyboard/mouse 205, and NIC 206 are connected to one another through an internal bus.

CPU 201 represents one example of an arithmetic unit performing processing for controlling overall operations of PC terminal 200.

RAM 202 functions as a work area during processing by CPU 201.

Storage apparatus 203 saves various types of data including various programs such as an operating system (OS) executed by CPU 201 or a browser application and data made use of for execution of such a program. Examples of storage apparatus 203 include media storing data in a non-volatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (except for memory cards), an optical card, a mask ROM, an EPROM, an EEPROM (Electronically Erasable Programmable Read-Only Memory), and the like. A program downloaded through a network may be installed in storage apparatus 203.

Display 204 is a display apparatus for displaying an image showing a result of processing of a program executed by CPU 201.

Keyboard/mouse 205 represents one example of an input apparatus for inputting information into PC terminal 200 such as input of a set value on a web browser.

NIC 206 represents one example of an information transmission and reception apparatus during exchange of information by PC terminal 200 with MFP 100.

<Functional Configuration of MFP 100>

Figure 3:
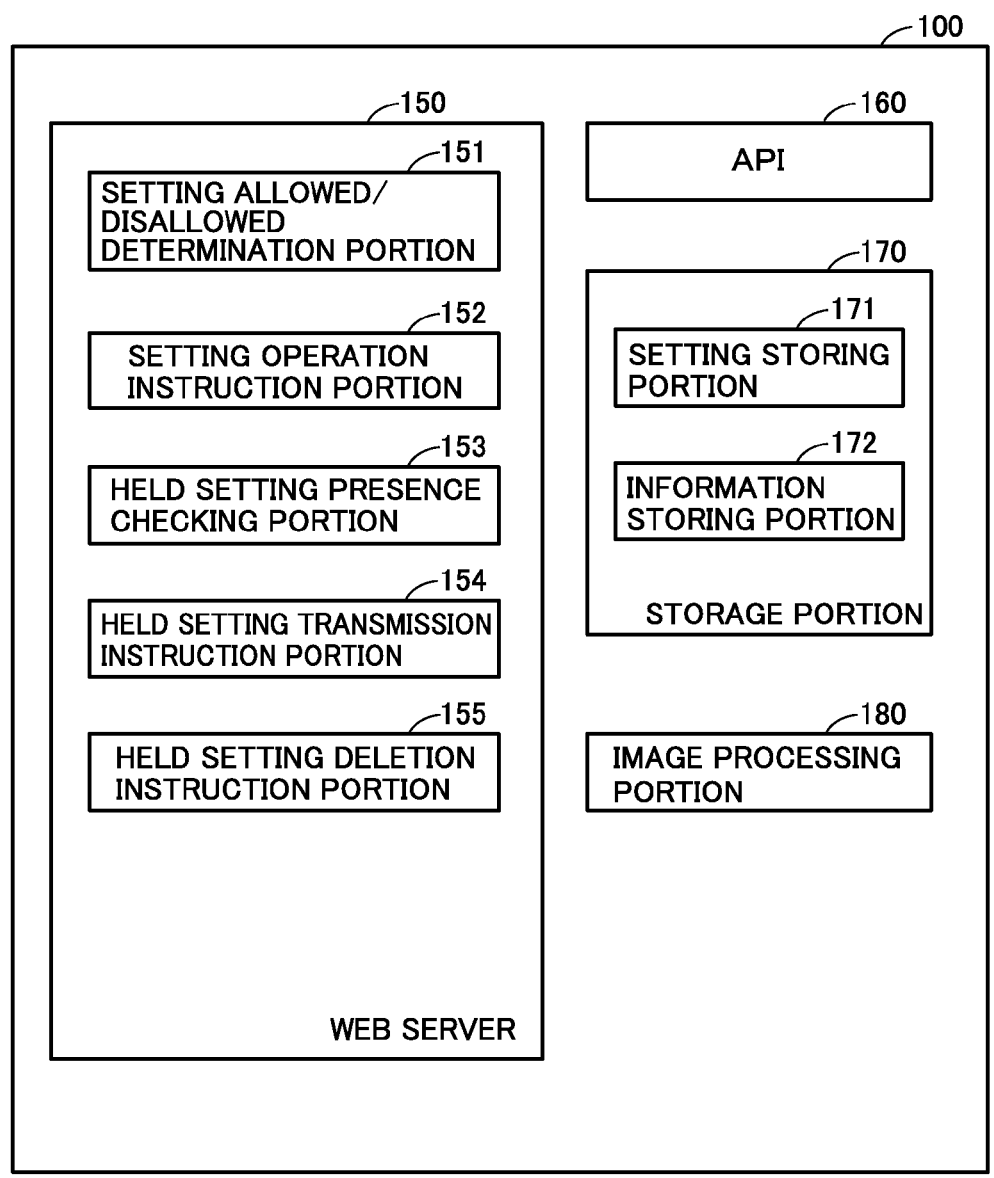
FIG. 3 is a diagram showing one example of a functional configuration of the MFP.

FIG. 3 is a diagram showing one example of a functional configuration of MFP 100. As shown in FIG. 3, MFP 100 includes web server 150, API 160, storage portion 170, and an image processing portion 180. Web server 150 is implemented, for example, as CPU 101 in FIG. 2 executes a program for the web server. API 160 is implemented, for example, as CPU 101 executes a software program for the API. Storage portion 170 is implemented, for example, by auxiliary storage apparatus 104 in FIG. 2, and includes setting storing portion 171 and information storage portion 172. Image processing portion 180 processes image data for image formation or the like, and implemented, for example, by scanner portion 108 and printer portion 109 in FIG. 2 as well as CPU 101 performing processing for controlling the same.

Web server 150 includes a setting allowed/disallowed determination portion 151, a setting operation instruction portion 152, a saved setting presence checking portion 153, a saved setting transmission instruction portion 154, and a saved setting deletion instruction portion 155.

Setting allowed/disallowed determination portion 151 determines whether or not to accept a request for setting processing from web browser 250 based on a state of MFP 100 (a utilization factor of CPU 101, the number and/type of jobs being executed, occurrence of an error, presence of a user who has logged in, or contents of processing performed through operation panel 107).

When setting allowed/disallowed determination portion 151 determines that setting processing is not accepted, setting operation instruction portion 152 instructs web browser 250 to save the set value on web browser 250 without allowing web browser 250 to transmit the set value. Thereafter, when setting allowed/disallowed determination portion 151 determines that setting processing is accepted, setting operation instruction portion 152 instructs web browser 250 to transmit the set value to MFP 100.

Saved setting presence checking portion 153 checks whether or not there is a set value saved on web browser 250.

Saved setting transmission instruction portion 154 instructs web browser 250 to transmit the set value saved on web browser 250 to MFP 100.

Saved setting deletion instruction portion 155 instructs web browser 250 to delete the set value saved on web browser 250.

<Functional Configuration of PC Terminal 200>

Figure 4:
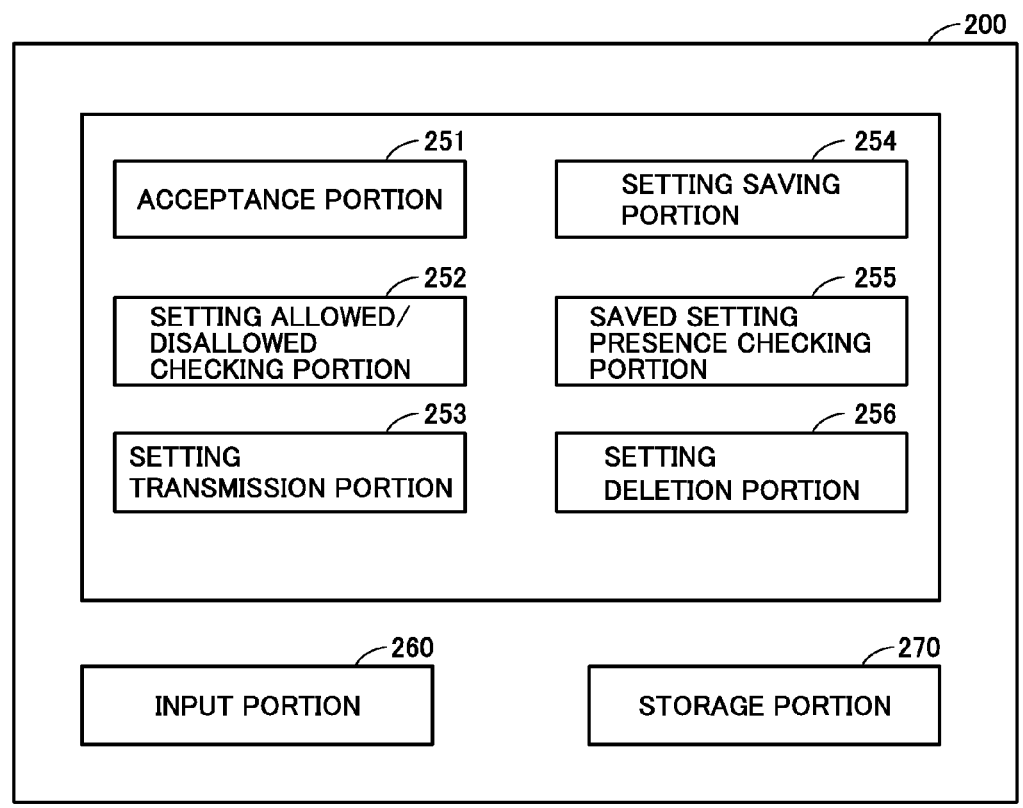
FIG. 4 is a diagram showing one example of a functional configuration of the PC terminal.

FIG. 4 is a diagram showing one example of a functional configuration of PC terminal 200. As shown in FIG. 4, PC terminal 200 includes web browser 250, an input portion 260, and a storage portion 270. Web browser 250 is implemented, for example, as CPU 201 in FIG. 2 executes a program for the web browser. Input portion 260 is an interface for input of information from a user and implemented, for example, by keyboard/mouse 205. Storage portion 270 stores various types of information such as a set value and implemented, for example, by RAM 202 or storage apparatus 203.

Web browser 250 includes an acceptance portion 251, a setting allowed/disallowed checking portion 252, a setting transmission portion 253, a setting saving portion 254, a saved setting presence checking portion 255, and a saved setting deletion portion 256.

Acceptance portion 251 accepts input of a set value for an operation of MFP 100, for example, through input portion 260.

Setting allowed/disallowed checking portion 252 checks whether or not MFP 100 accepts setting processing of a set value by communicating with web server 150.

Setting transmission portion 253 transmits the set value to web server 150 of MFP 100 through NIC 206.

Setting saving portion 254 has a set value of which input has been accepted by acceptance portion 251 saved on web browser 250. Setting saving portion 254 is implemented, for example, by a Web Storage of the web browser. The set value is saved in storage portion 270.

Saved setting presence checking portion 255 checks whether or not there is a set value saved on web browser 250. More specifically, saved setting presence checking portion 255 determines whether or not a value is saved at an address for the Web Storage, for example, in storage portion 270.

Saved setting deletion portion 256 deletes the set value saved on web browser 250. More specifically, for example, saved setting deletion portion 256 performs processing for deleting data saved at the address for the Web Storage in storage portion 270.

<Flow of Process (Operation Instruction Process (1))>

Figure 5:
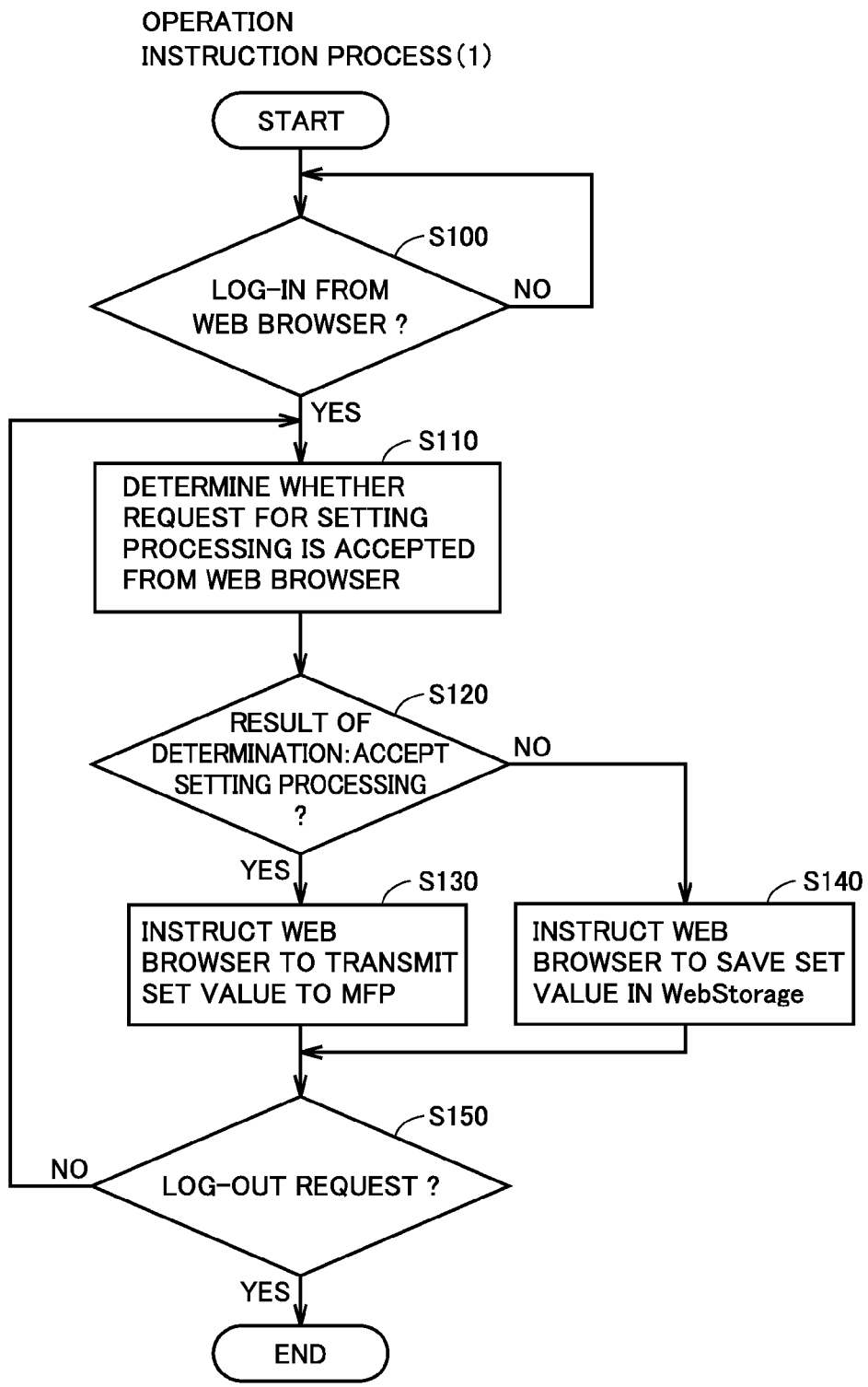
FIG. 5 is a flowchart of an operation instruction process (1) performed in the MFP.

As described with reference to FIG. 1, in the image processing system in the first embodiment, web server 150 of MFP 100 determines whether or not MFP 100 is in a state that a set value can be set. Then, when MFP 100 is in the state that the set value can be set, web server 150 instructs web browser 250 of PC terminal 200 to transmit the set value. On the other hand, when MFP 100 is in a state that the set value cannot be set, web server 150 instructs web browser 250 of PC terminal 200 to save the set value. In the first embodiment, processing performed in MFP 100 for performing such an operation is herein called an "operation instruction process (1)." FIG. 5 is a flowchart of the operation instruction process (1) performed by CPU 101. A flow of the operation instruction process (1) will be described below with reference to FIG. 5.

Referring to FIG. 5, in step S100, CPU 101 determines whether or not web server 150 has been logged in from web browser 250. Then, when CPU 101 determines that the web server has not been logged in, control remains at step S100 (NO in step S100), and when it determines that the web server has been logged in, control proceeds to step S110 (YES in step S100).

In step S110, CPU 101 determines whether or not MFP 100 is in a state that a request for setting processing is accepted from web browser 250. For example, when a job is being executed in MFP 100, CPU 101 determines that MFP 100 is not in the state that a request for setting processing is accepted, and when a job is not being executed, it determines that MFP 100 is in the state that the request for the setting processing is accepted.

Alternatively, CPU 101 may make such a determination, for example, based on another criterion. For example, CPU 101 may make a determination based on a utilization factor of CPU 101, a type of a job being executed in MFP 100 (a type of processing being performed by CPU 101), or the number of jobs reserved in MFP 100. Among these, regarding the utilization factor, when the utilization factor of CPU 101 is equal to or greater than a specific value, it is determined that MFP 100 is not in the state that the request for setting processing is accepted, and when the utilization factor is smaller than the specific value, it is determined that MFP 100 is in the state that the request for setting processing is accepted. Regarding the type of a job, when a job being executed is a scanning job, it is determined that MFP 100 is in the state that the request for setting processing is accepted, and when the job is a print job, it is determined that MFP 100 is not in the state that the request for setting processing is accepted. Regarding the number of jobs, when the number of reserved jobs (the number of jobs to be executed hereafter) is equal to or greater than a specific number, it is determined that MFP 100 is not in the state that the request for setting processing is accepted, and when the number is smaller than the specific number, it is determined that MFP 100 is in the state that the request for setting processing is accepted.

CPU 101 carrying out control in step S110 described above implements setting allowed/disallowed determination portion 151 (FIG. 3). Then, control proceeds to step S120.

In step S120, CPU 101 allows control to proceed based on a result of determination in step S110. More specifically, when it is determined in step S110 that MFP 100 is in the state that the request for setting processing is accepted (YES in step S120), control proceeds to step S130. When it is determined in step S110 that MFP 100 is not in the state that the request for setting processing is accepted (NO in step S120), control proceeds to step S140.

In step S130, CPU 101 transmits an instruction to web browser 250 to transmit the set value to MFP 100. Web browser 250 saves at least a most recent instruction transmitted from web server 150. Then, control proceeds to step S150.

In step S140, CPU 101 transmits to web browser 250, an instruction for saving the set value in web browser 250, without transmitting the set value to MFP 100. Web browser 250 saves at least the most recent instruction transmitted from web server 150. Then, control proceeds to step S150.

CPU 101 carrying out control from step S120 to step S140 described above implements setting operation instruction portion 152 (FIG. 3).

In step S150, CPU 101 determines whether or not a log-out request has been issued from web browser 250. When CPU 101 determines that there is no log-out request, control returns to step S110 (NO in step S150). When CPU 101 determines that a log-out request has been issued, it quits the process in FIG. 5 (YES in step S150). In the process in FIG. 5, step S110 to step S150 are performed, for example, every certain time.

Figure 6:
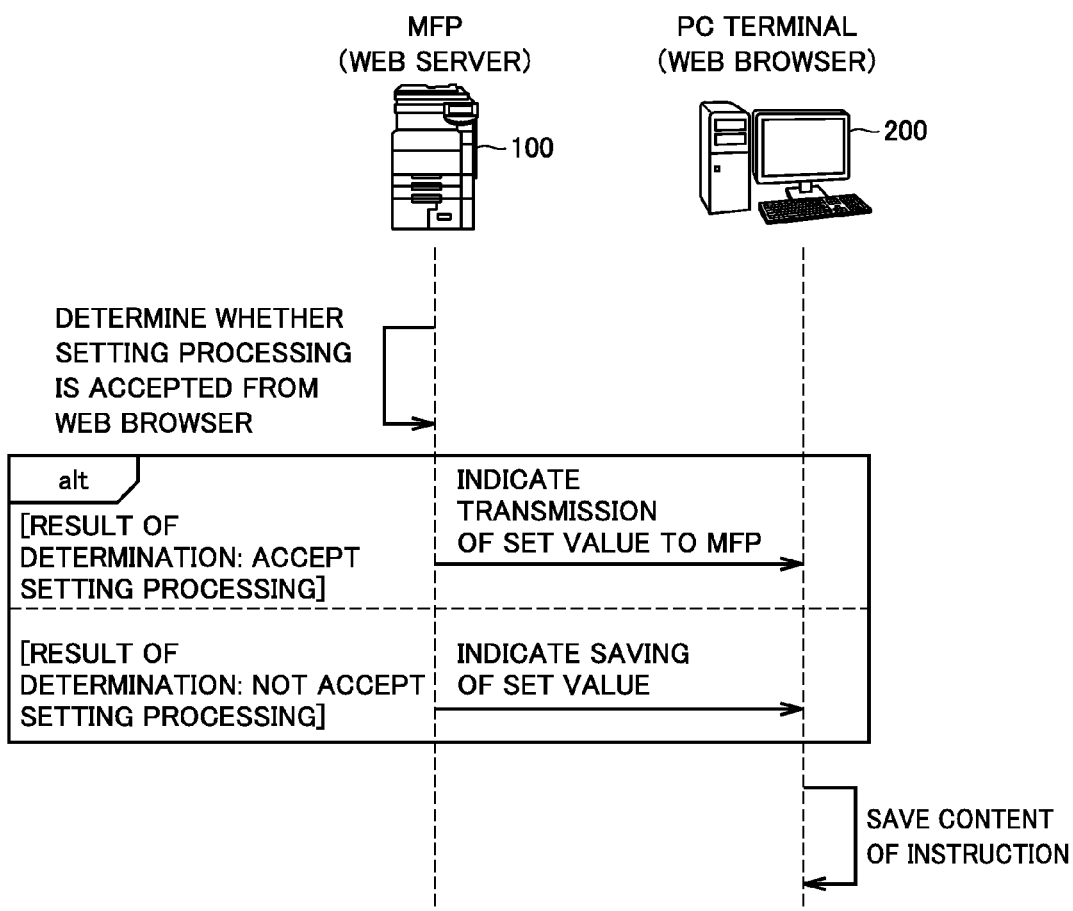
FIG. 6 is a diagram schematically showing contents of the process in FIG. 5.

FIG. 6 is a diagram schematically showing contents of the process in FIG. 5. FIG. 6 shows web server 150 as MFP 100 and shows web browser 250 as PC terminal 200.

As shown in FIG. 6, MFP 100 determines whether or not MFP 100 is in the state that the setting processing is accepted from web browser 250, and transmits an instruction to web browser 250 in accordance with a result thereof. More specifically, when MFP 100 is in the state that the setting processing is accepted ("result of determination: accept setting processing" in FIG. 6), MFP 100 instructs PC terminal 200 to transmit the set value to MFP 100. When MFP 100 is not in the state that the setting processing is accepted ("result of determination: not accept setting processing" in FIG. 6), MFP 100 instructs PC terminal 200 to save the set value in the Web Storage of web browser 250.

When contents of the most recent instruction received by PC terminal 200 at the time when transmission of the set value has been indicated in PC terminal 200 indicate "save set value in Web Storage," PC terminal 200 has the input set value saved in the Web Storage.

<Flow of Process (Set Value Saving Process)>

Figure 7:
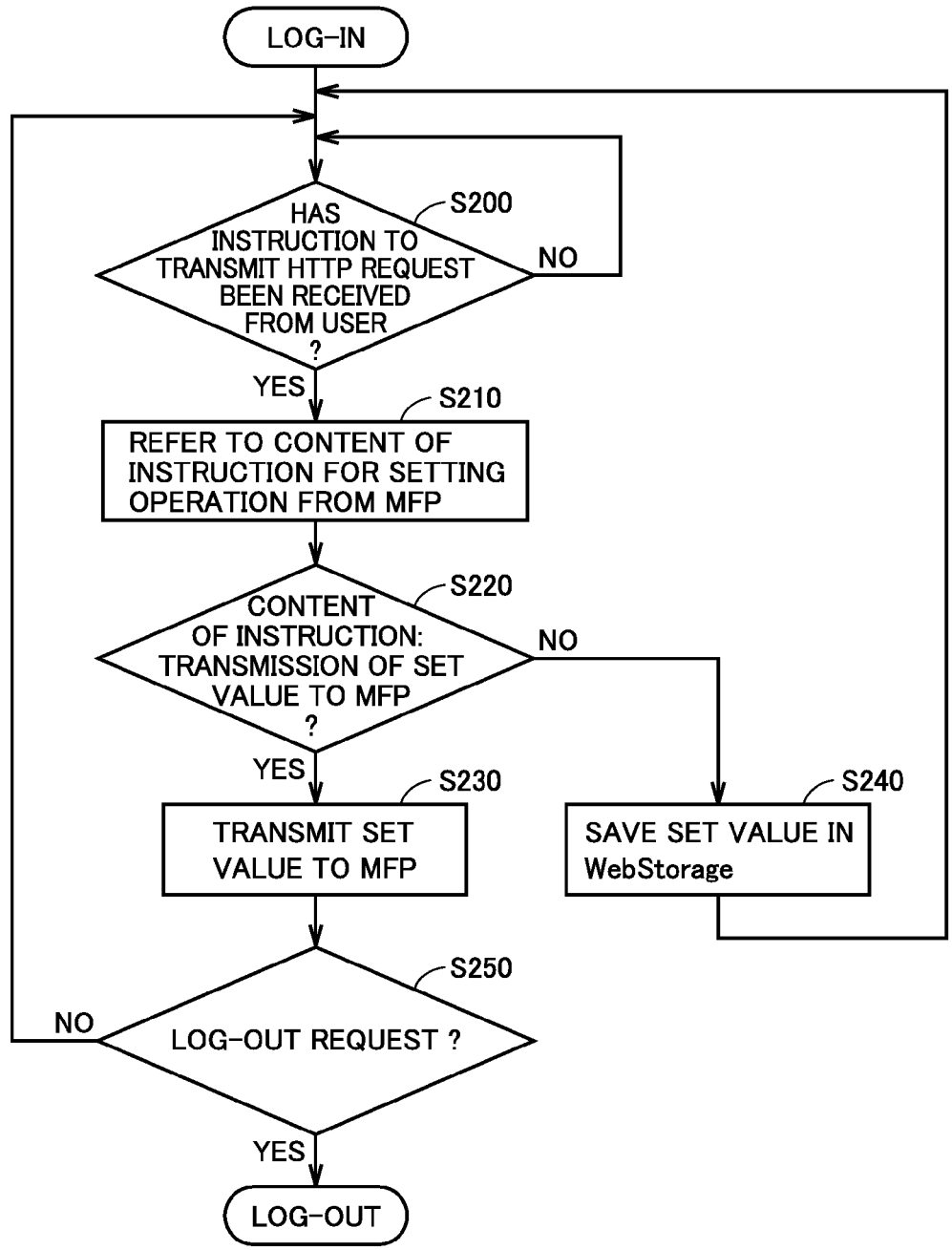
FIG. 7 is a flowchart of a set value saving process.

As described above, PC terminal 200 (web browser 250) determines whether to transmit or save the set value in accordance with an instruction from MFP 100 (web server 150). Such a process on a side of PC terminal 200 is herein called a "set value saving process." FIG. 7 is a flowchart of the set value saving process. Contents in the set value saving process will be described below with reference to FIG. 7. The set value saving process is performed while web browser 250 has logged in web server 150.

Referring to FIG. 7, in step S200, CPU 201 determines whether or not an instruction for transmission of an HTTP request has been given from a user. The transmission instruction is given, for example, as the user of PC terminal 200 inputs a set value on a screen of web browser 250 and finally presses an OK button. CPU 201 carrying out control for accepting a set value implements acceptance portion 251 (FIG. 4). Then, control proceeds to step S210.

In step S210, CPU 201 refers to contents of an instruction transmitted from MFP 100 (web server 150) (steps S130 and 140 in FIG. 5). Here, a most recent instruction saved in web browser 250 is referred to. CPU 201 carrying out control in step S210 implements setting allowed/disallowed checking portion 252 (FIG. 4). Then, control proceeds to step S220.

In step S220, CPU 201 allows control to proceed in accordance with the contents of the instruction referred to in step S210. More specifically, CPU 201 allows control to proceed to step S230 when the instruction indicates transmission of the set value to MFP 100 (YES in step S220). When the instruction indicates saving of the set value in web browser 250, CPU 201 allows control to proceed to step S240 (NO in step S220).

In step S230, CPU 201 transmits the set value input as above to MFP 100 as an HTTP request. CPU 201 carrying out control in step S230 implements setting transmission portion 253 (FIG. 4). Then, control proceeds to step S250.

In step S240, CPU 201 has the Web Storage save the set value input as above. The set value is saved, for example, in a Key-Value type. In particular, when not only the set value but also about which set item the set value is saved, both of the set item and the set value can be stored as a "Value" in a manner of storage of the Key-Value type. For example, when a "set value a for a set item A" is stored, "setting 1" is stored as a "Key" and "A=a" is stored as a "Value". CPU 201 carrying out control in step S240 implements setting saving portion 254 (FIG. 4) and CPU 201 carrying out control in step S230 implements setting transmission portion 253 (FIG. 4). Then, control returns to step S210.

In step S250, CPU 201 determines whether or not a request for log-out has been input. When CPU 201 determines that there is no log-out request, control returns to step S200 (NO in step S250), and when it is determined that a log-out request has been made, the process in FIG. 7 ends.

Figure 8:
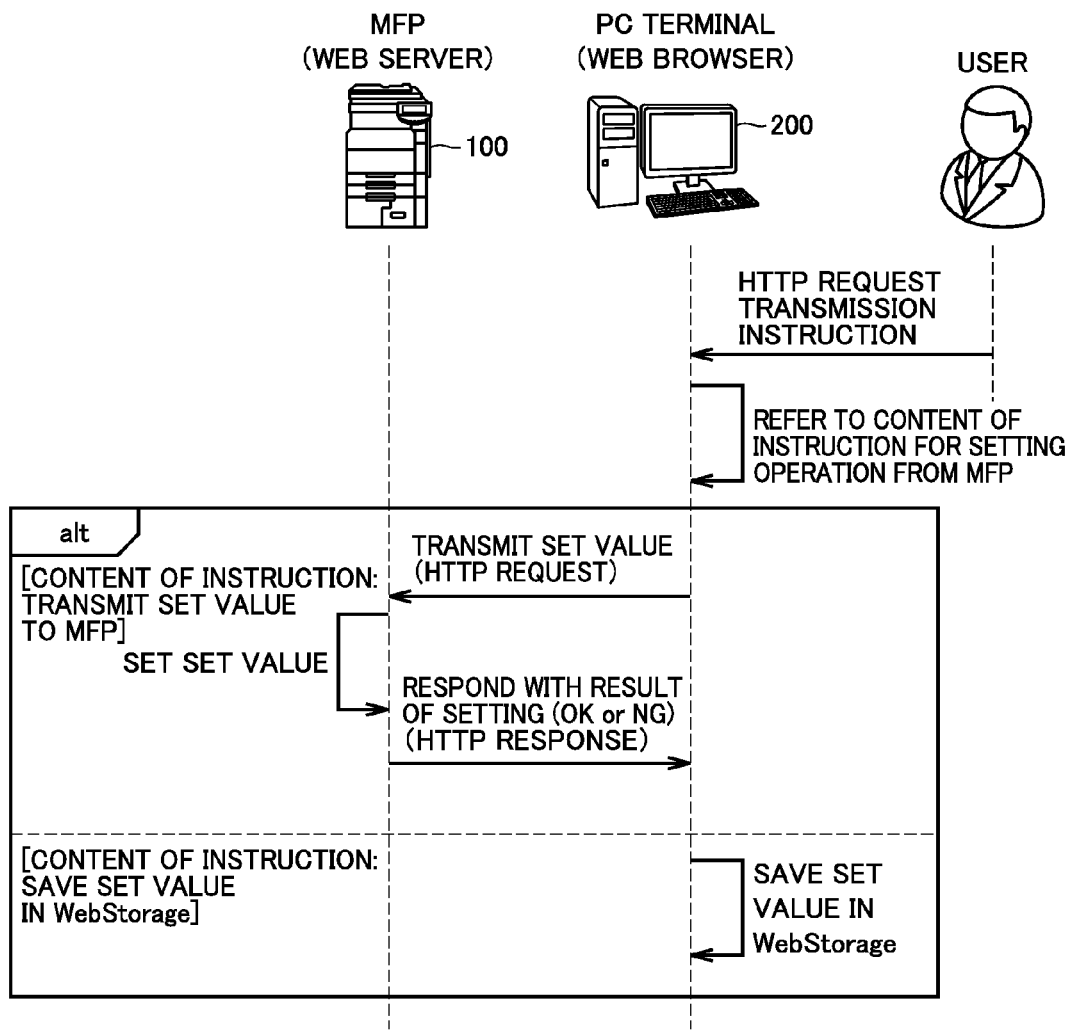
FIG. 8 is a diagram schematically showing contents of the process in FIG. 7.

FIG. 8 is a diagram schematically showing contents of the process in FIG. 7. FIG. 8 shows web server 150 as MFP 100 and shows web browser 250 as PC terminal 200.

As shown in FIG. 8, when PC terminal 200 is indicated to transmit an HTTP request by the user, it refers to the contents of the instruction from MFP 100. The HTTP request is a request for setting a set value input on web browser 250 in MFP 100. The contents of the instruction are transmitted, for example, regularly from MFP 100 as described with reference to FIGS. 5 and 6.

When the instruction from MFP 100 is "transmission of the set value," PC terminal 200 transmits the set value to MFP 100 as the HTTP request, which corresponds to "content of instruction: transmit set value to MFP" in FIG. 8. Thereafter, MFP 100 transmits a result of processing for setting of the set value (OK (success) or NG (failure)) as an HTTP response.

On the other hand, when the instruction from MFP 100 indicates "saving of set value," PC terminal 200 has the Web Storage save the set value, without transmitting the HTTP request at that time point, which corresponds to "content of instruction: save set value in Web Storage" in FIG. 8.

<Flow of Process (Operation Instruction Process (2))>

Figure 9:
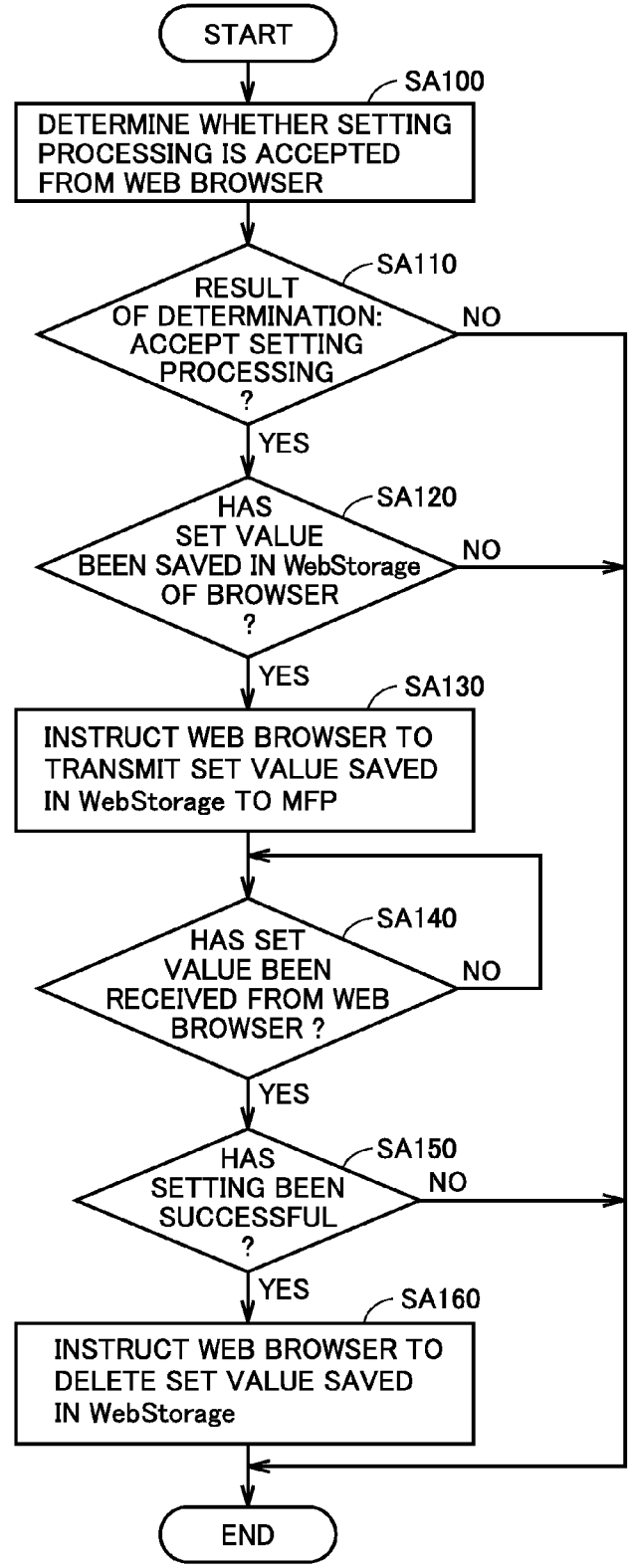
FIG. 9 is a flowchart of an operation instruction process (2) performed in the MFP.

Web server 150 of MFP 100 instructs web browser 250 to transmit the set value saved in web browser 250 as described above. Such a process on a side of MFP 100 is herein called an "operation instruction process (2)." FIG. 9 is a flowchart of the operation instruction process (2) performed in MFP 100. Contents in the operation instruction process (2) will be described with reference to FIG. 9. The process is performed while web browser 250 has logged in.

Initially, in step SA100, CPU 101 determines whether or not MFP 100 is in a state that a request for setting processing from web browser 250 is accepted, as in step S110 (FIG. 5). Then, control proceeds to step SA110.

In step SA110, CPU 101 determines whether or not a result of determination in step SA100 indicates the state that the request for setting processing is accepted. Then, when the result of determination indicates the state that the setting processing is accepted (YES in step SA110), CPU 101 allows control to proceed to step SA120. On the other hand, when the result of determination indicates a state that setting processing is not accepted (NO in step SA110), CPU 101 quits the process in FIG. 9.

In step SA120, CPU 101 determines whether or not the set value is saved on web browser 250. For example, CPU 101 as web server 150 inquires of web browser 250 as to whether or not the set value is saved in the Web Storage, and makes a determination in step SA120 based on a result of the inquiry. Then, when it is determined that the set value is saved in the Web Storage (YES in step SA120), CPU 101 allows control to proceed to step SA130. When it is determined that the set value is not saved in the Web Storage, CPU 101 quits the process in FIG. 9.

In step SA130, CPU 101 transmits to web browser 250, an instruction to transmit the set value to MFP 100 as in step S130 (FIG. 5). In response, CPU 201 (step S230 in FIG. 7) transmits the set value to MFP 100 as the HTTP request. Then, control proceeds to step SA140.

In step SA140, CPU 101 determines whether or not the set value has been received from web browser 250. Then, CPU 101 remains at control in step SA140 until it is determined that the set value has been received from web browser 250 (NO in step SA140), and when it is determined that the set value has been received, control proceeds to step SA150. CPU 101 sets received data (set value) in MFP 100 by using API 160 to access data in storage portion 170. CPU 101 transmits a result of setting to web browser 250 as the HTTP response. Then, control proceeds to step SA150.

In step SA150, CPU 101 determines whether or not the setting accepted in step SA110 has been successful. When it is determined that no log-out request has been successful, CPU 101 returns control to step SA110. When it is determined that a log-out request has been issued, CPU 101 allows control to proceed to step SA160.

In step SA160, CPU 101 instructs web browser 250 to delete the set value saved in the Web Storage. Then, CPU 101 quits the process in FIG. 9.

Figure 10:
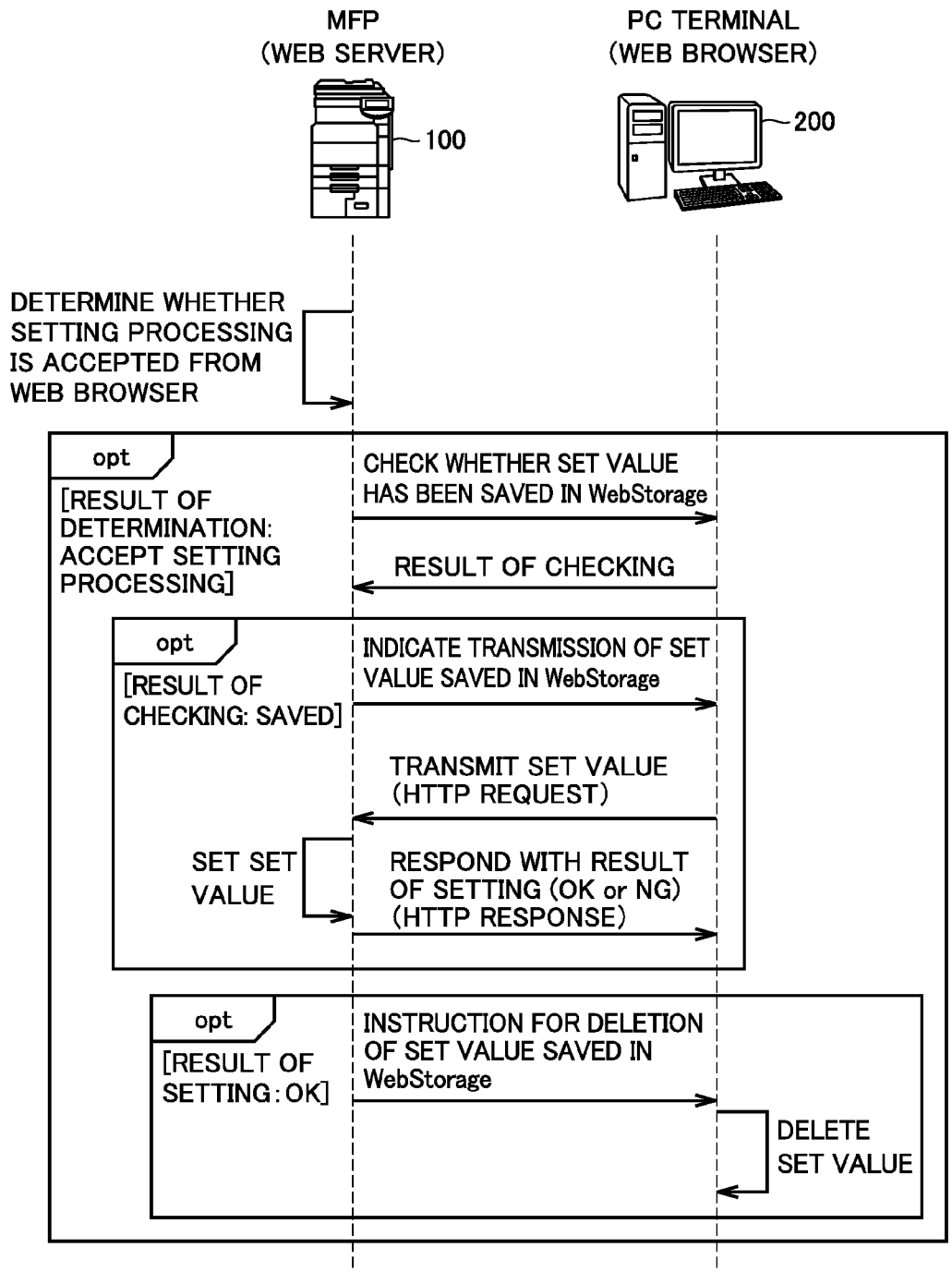
FIG. 10 is a diagram schematically showing contents of the process shown in FIG. 9.

FIG. 10 is a diagram schematically showing contents of the process shown in FIG. 9. FIG. 10 shows web server 150 as MFP 100 and shows web browser 250 as PC terminal 200.

As shown in FIG. 10, MFP 100 determines whether or not MFP 100 is in the state that MFP 100 accepts setting processing from PC terminal 200. When it is determined that the MFP is in such a state ("result of determination: accept setting processing" in FIG. 10), the MFP inquires of PC terminal 200 about whether or not the set value is saved in the Web Storage of web browser 250.

When the result of the inquiry indicates that the set value has been saved ("result of checking: saved" in FIG. 10), MFP 100 instructs PC terminal 200 to transmit the set value. In response, PC terminal 200 transmits the set value to MFP 100 ("HTTP request" in FIG. 10). In response, MFP 100 sets the set value in MFP 100. When another set value for a content corresponding to the set value has already been set, another set value is updated to a new set value.

<Effect of Embodiment>

In the first embodiment, when MFP 100 is in a state that setting processing is not accepted, web server 150 instructs web browser 250 to save a set value input on web browser 250 on web browser 250 without transmitting the set value to MFP 100. Then, when MFP 100 is in a state that setting processing is accepted, web server 150 instructs web browser 250 to transmit the set value saved in web browser 250 to MFP 100. Thus, when MFP 100 is in the state that setting processing is not accepted, the set value is once saved on web browser 250, and when MFP 100 is in the state that setting processing is accepted, web browser 250 transmits the set value to MFP 100.

Thus, even when MFP 100 does not accept setting processing at the time point when the user inputs the set value into web browser 250, the set value is once saved on web browser 250. Then, web browser 250 subsequently transmits the set value to MFP 100 without requiring an operation by the user again.

Therefore, even when time-out is set in web server 150 in a case as above, the set value is set in MFP 100 without the user performing again an operation for inputting the set value or issuing a request for setting through the web browser.

In addition, when the set value saved in web browser 250 is set in MFP 100, web server 150 instructs web browser 250 to delete the saved set value.

Thus, such a situation that an unnecessary set value continues to be saved on web browser 250 can be avoided.

Second Embodiment

An image processing system in a second embodiment includes MFP 100 and PC terminal 200 similarly to the image processing system in the first embodiment. Since a hardware configuration thereof can be the same as described in the first embodiment (FIG. 2), detailed description will not be repeated.

<Overview of Process in Image Processing System>

In the image processing system in the first embodiment, when MFP 100 is in a state that MFP 100 does not accept setting processing, MFP 100 instructs PC terminal 200 to save a set value. On the other hand, in the image processing system in the second embodiment, when MFP 100 is in a state that setting processing is not accepted, MFP 100 further specifies a module constituting a factor for not accepting setting processing, and determines whether or not to instruct PC terminal 200 to save the set value in accordance with a type of the specified module.

Auxiliary storage apparatus 104 of MFP 100 in the second embodiment stores information (saving necessity information) specifying whether or not to have PC terminal 200 save the set value when each module of MFP 100 constitutes the factor for not accepting setting processing. In making a determination in accordance with a "type of the module" above, saving necessity information is referred to.

More specifically, for example, MFP 100 includes a web server module (web server 150) and an API module (API 160). Then, when load of at least one of these modules is high, web server 150 determines that MFP 100 is not in a state that setting processing is accepted. Then, for the web server module, when load is high, for example, the saving necessity information has PC terminal 200 save the set value. On the other hand, for example, for the API module, even when load is high, the saving necessity information does not have PC terminal 200 save the set value. Technical significance thereof will be described below.

One example of the factor for high load of the web server module (web server 150) is that a resource of CPU 101 is not sufficiently allocated to the web server module (web server 150) when MFP 100 is transmitting and receiving data to and from an external device, performing processing for converting an image, or performing processing for stabilizing an image. Such a situation may frequently or regularly occur, and it is difficult for a user of web browser 250 to know when such a situation will be eliminated. Therefore, in the image processing system in the second embodiment, in such a case, instead of having the user wait for elimination of the situation, preferably, PC terminal 200 saves the set value and the set value is automatically set in MFP 100 after the situation is eliminated.

On the other hand, one example of the factor for high load of the API module (API 160) is reception of a large amount of data (destination data or box data) stored in storage portion 170 (FIGS. 1 and 3) or transmission of a large amount of data from storage portion 170. Such a factor is considered as not frequently occurring, and a time-out period is set also for processing in API 160. Therefore, the factor is considered as not continuing for a long period of time. Therefore, in the image processing system in the second embodiment, when MFP 100 is in the state that setting processing is not accepted for the factor above, the set value is not saved in PC terminal 200. Thus, the number of times of saving of the set value in PC terminal 200 can be minimized. Therefore, increase in frequency of access by web browser 250 to the Web Storage can be avoided as much as possible. Thus, such a situation that performance of web browser 250 lowers can be avoided as much as possible.

Figure 11:
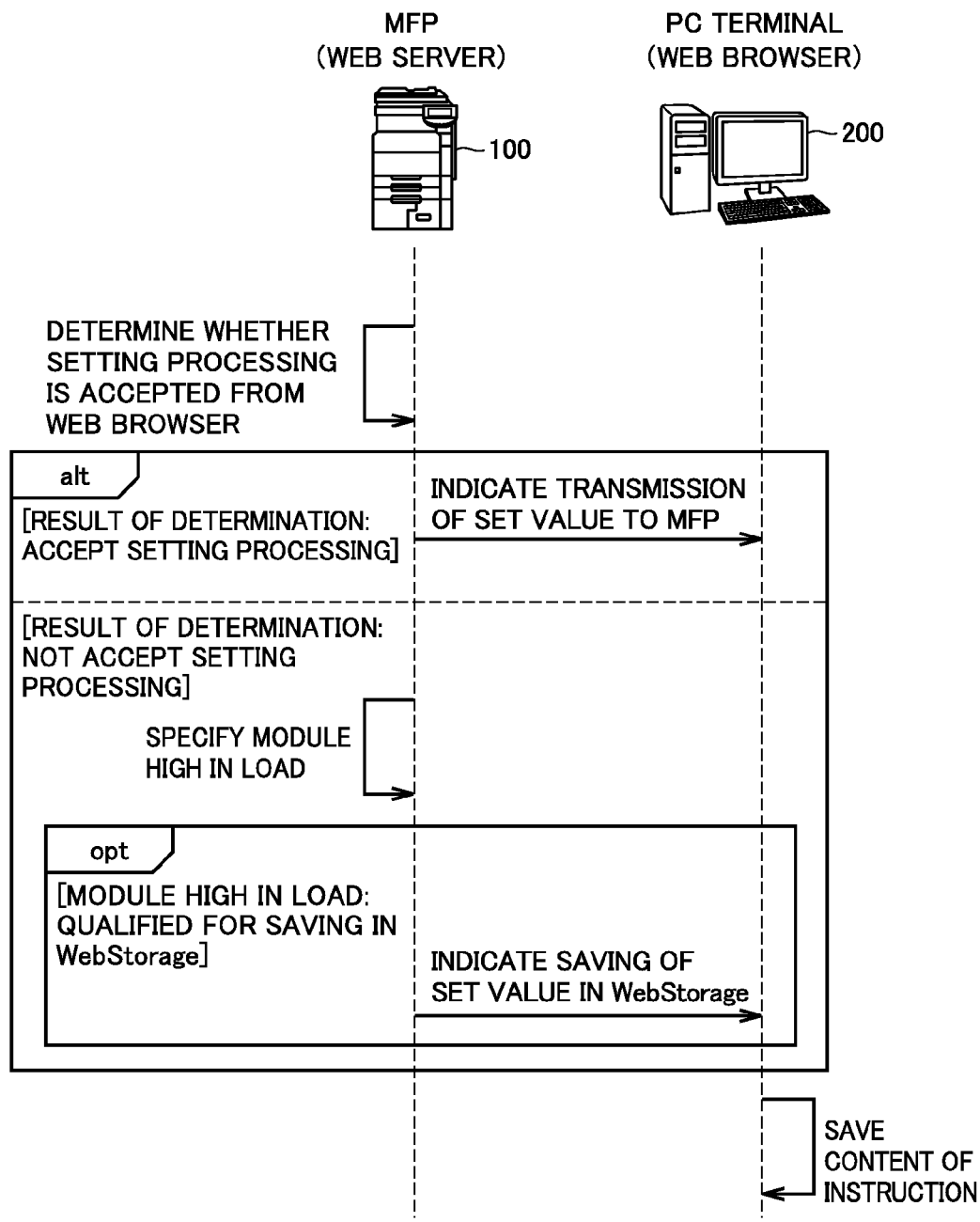
FIG. 11 is a diagram showing overview of an operation instruction process (1A) performed in a second embodiment.

In the second embodiment, the process shown in FIG. 6 is replaced with FIG. 11. FIG. 11 is a diagram showing overview of an operation instruction process (operation instruction process (1A)) performed in the second embodiment. Contents in the operation instruction process (1A) will be described below.

<Operation Instruction Process (1A)>

As shown in FIG. 11, MFP 100 determines whether or not MFP 100 is in the state that MFP 100 accepts setting processing from PC terminal 200. Then, when a result of determination indicates that MFP 100 is in the state that it accepts setting processing ("result of determination: accept setting processing" in FIG. 11), an instruction to transmit the set value to MFP 100 is transmitted to PC terminal 200.

On the other hand, when a result of determination indicates that MFP 100 is not in the state that setting processing is accepted, MFP 100 further specifies a module constituting a factor for not accepting setting processing, that is, a module high in load in MFP 100. Then, when the specified module is set as a module having PC terminal 200 save the set value in the saving necessity information ("module high in load: qualified for saving in Web Storage" in FIG. 11), MFP 100 transmits to PC terminal 200, an instruction to save the set value.

In PC terminal 200, the instruction is saved in storage apparatus 203 when the instruction is transmitted from MFP 100.

On the other hand, when the module specified as above is set as a module not having PC terminal 200 save the set value in the saving necessity information above, MFP 100 does nothing. Thus, an instruction for transmission or saving of the set value is not transmitted from MFP 100 to PC terminal 200. In such a case, when transmission of an HTTP request about setting of the set value is indicated in PC terminal 200, PC terminal 200 transmits the HTTP request. MFP 100 attempts to set the set value based on the HTTP request. When setting is completed by the time a time-out period elapses, an HTTP response indicating completion of setting is transmitted to PC terminal 200, and when setting is not completed by the time the time-out period elapses, an HTTP response indicating failure of setting is transmitted to PC terminal 200.

Figure 12:
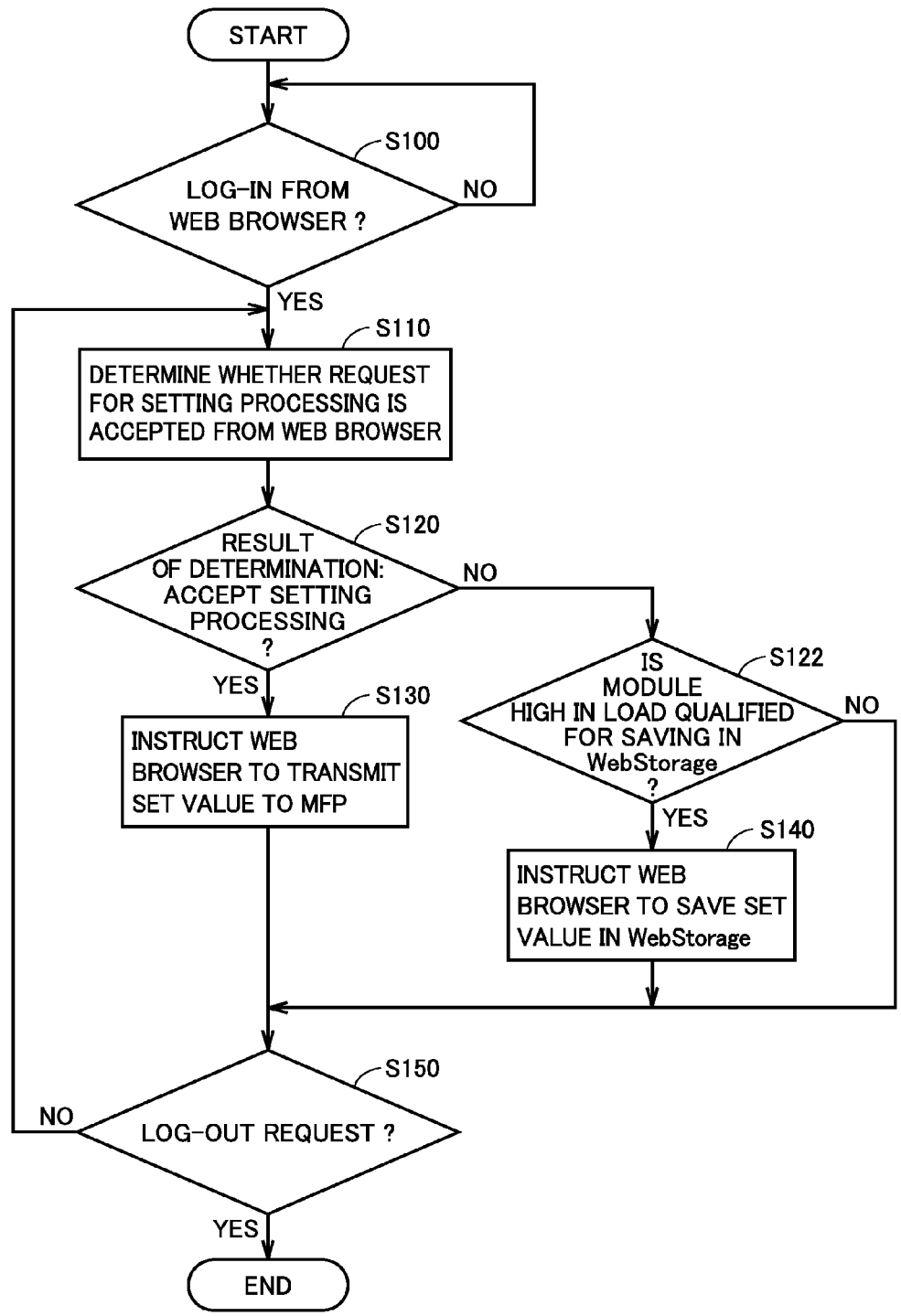
FIG. 12 is a flowchart of the operation instruction process (1A) performed in the MFP.

FIG. 12 is a flowchart of the operation instruction process (1A). As compared with the flowchart of the operation instruction process shown in FIG. 5, in the flowchart in FIG. 12, when a result of determination in step S120 indicates that setting processing is not accepted, control proceeds to step S122.

In step S122, CPU 101 specifies a module high in load which constitutes a factor for not accepting setting processing, and determines whether or not the module is qualified for having the set value saved in the Web Storage of web browser 250 in the saving necessity information. Then, when CPU 101 determines that the module is qualified for having the set value saved in the Web Storage of web browser 250 in the saving necessity information, control proceeds to step S140. On the other hand, when CPU 101 determines that the module is not qualified for having the set value saved in the Web Storage of web browser 250 in the saving necessity information, control proceeds to step S150 without executing the control in step S140.

In step S140, CPU 101 transmits an instruction to web browser 250 (PC terminal 200) to save the set value in the Web Storage. Then control proceeds to step S150.

<Functional Configuration of MFP 100>

Figure 13:
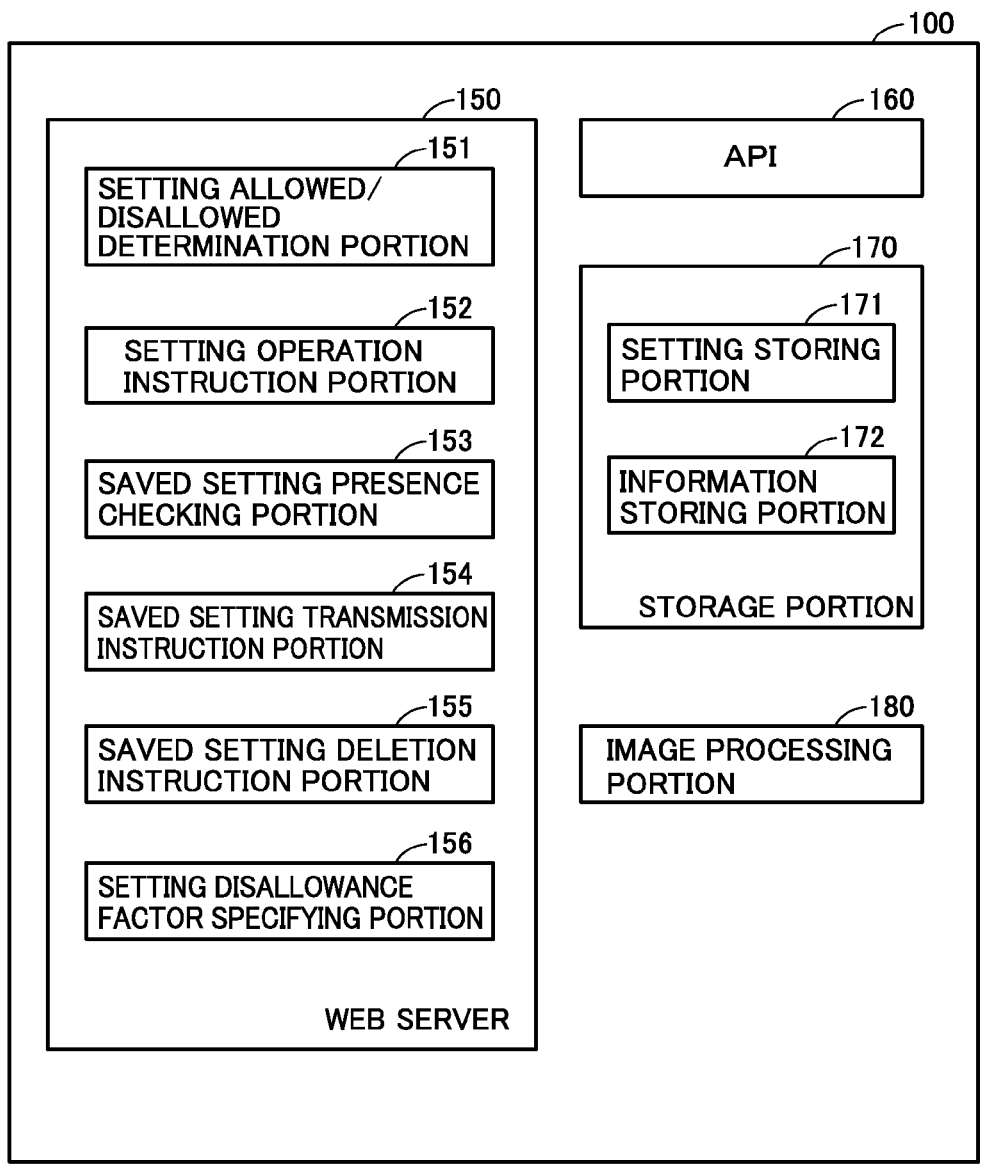
FIG. 13 is a diagram showing one example of a functional configuration of a web server in the second embodiment.

FIG. 13 is a diagram showing one example of a functional configuration of web server 150 in the second embodiment. As shown in FIG. 13, web server 150 in the second embodiment further includes a setting disallowance factor specifying portion 156 in addition to the configuration shown in FIG. 3. When setting allowed/disallowed determination portion 151 determines that setting processing is not accepted, setting disallowance factor specifying portion 156 specifies a module in MFP 100 constituting the factor for the determination. Setting disallowance factor specifying portion 156 is implemented, for example, by CPU 101 carrying out control in step S122.

Third Embodiment

An image processing system in a third embodiment includes MFP 100 and PC terminal 200 similarly to the image processing system in the first embodiment. Since a hardware configuration thereof can be the same as described in the first embodiment (FIG. 2), detailed description will not be repeated.

<Overview of Process in Image Processing System>

Figure 14:
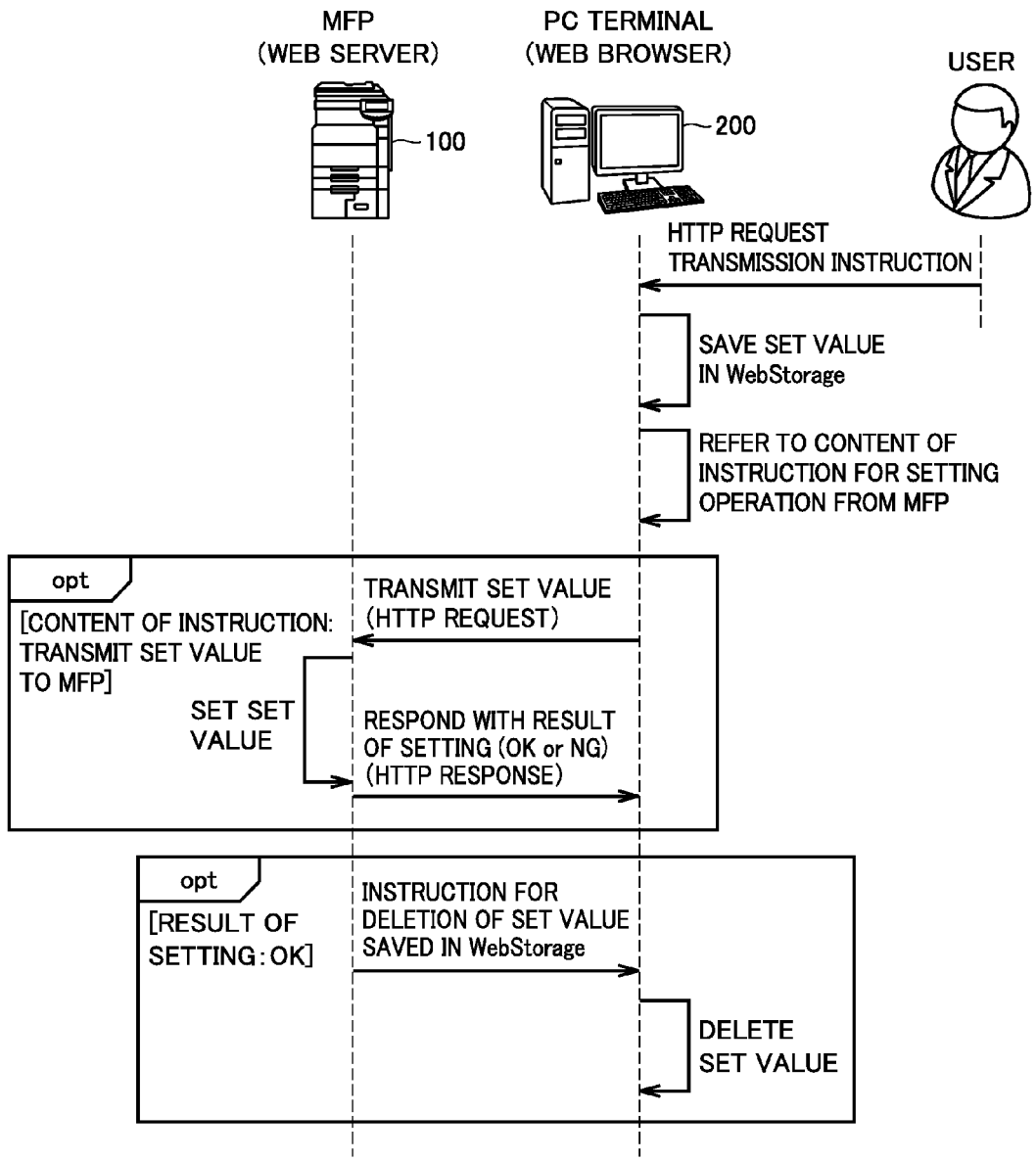
FIG. 14 is a diagram showing overview of a set value saving process (A) in an image processing system in a third embodiment.

In the third embodiment, a set value is saved in PC terminal 200 not in response to an instruction from MFP 100 but in response to an instruction for transmission of an HTTP request in web browser 250. FIG. 14 is a diagram showing overview of a process (set value saving process (A)) in the image processing system in the third embodiment.

As shown in FIG. 14, when transmission of an HTTP request is indicated by the user in PC terminal 200, in PC terminal 200, a set value included in the HTTP request is saved in the Web Storage of web browser 250. Then, PC terminal 200 refers to a content in a most recent instruction from MFP 100 which has been saved in PC terminal 200.

When the content of the instruction indicates transmission of the set value to MFP 100 ("content of instruction: transmit set value to MFP" in FIG. 14), PC terminal 200 transmits an HTTP response to MFP 100. MFP 100 performs processing for setting a set value in response to reception of the HTTP response, and transmits a result of processing (success (OK) or failure (NG)) to PC terminal 200 as the HTTP response. Then, when a result in the HTTP response indicates success of processing ("result of setting: OK" in FIG. 14), MFP 100 further transmits an instruction for deletion of the saved set value to PC terminal 200. In response, PC terminal 200 deletes the set value saved in the Web Storage of web browser 250.

On the other hand, when the content of the instruction indicates saving of the set value, PC terminal 200 does not particularly perform processing. In the third embodiment, when MFP 100 is in the state that MFP 100 does not accept setting processing, MFP 100 does not have to transmit an instruction to PC terminal 200.

<Flow of Set Value Saving Process (A)>

Figure 15:
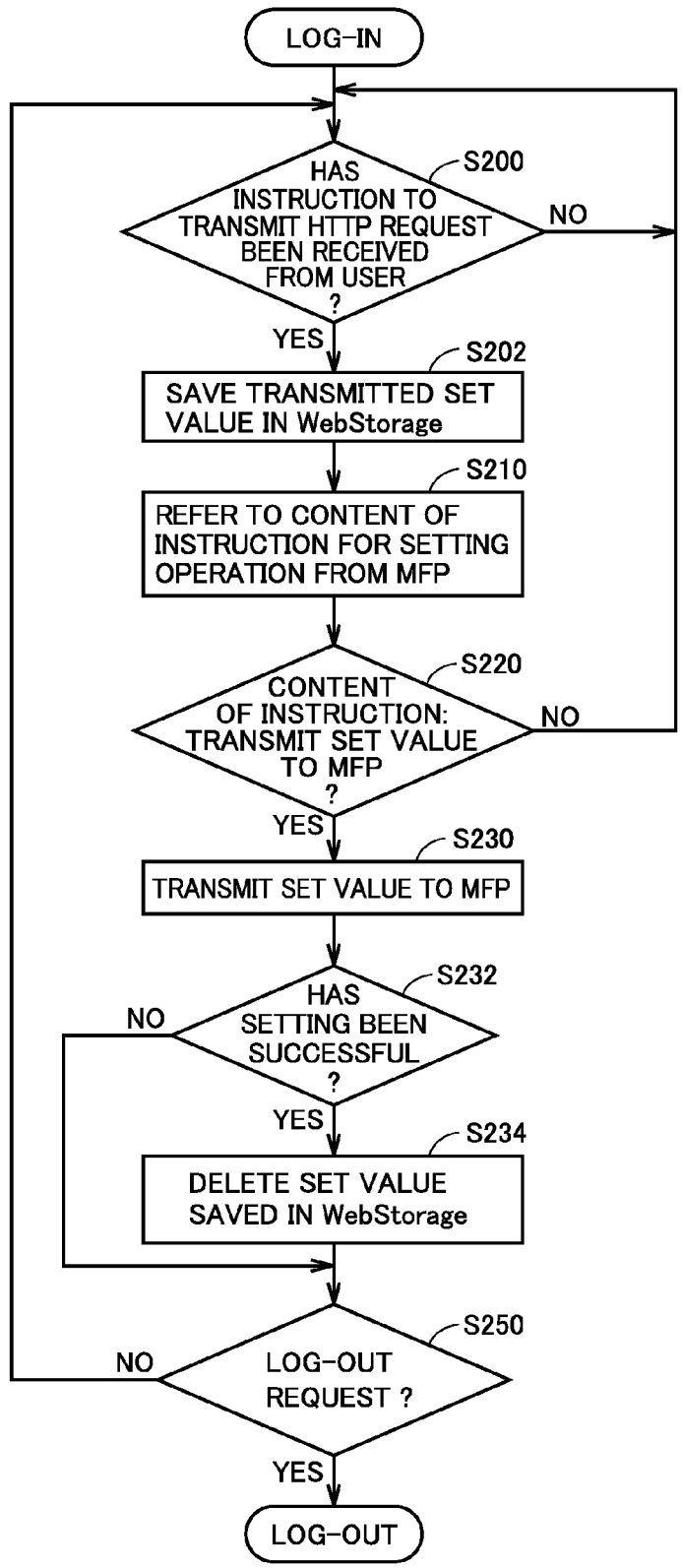
FIG. 15 is a flowchart of processing performed in the PC terminal in the set value saving process (A).

FIG. 15 is a flowchart of a process performed in PC terminal 200 in the set value saving process (A). As compared with the set value saving process in FIG. 7, in a set value comparison process in FIG. 15, when CPU 201 determines in step S200 that an instruction for transmission of an HTTP request has been given, control proceeds to step S202.

In step S202, CPU 201 has the set value set by the HTTP request saved in the Web Storage of web browser 250. Then, control proceeds to step S210.

As compared with the set value saving process in FIG. 7, in the set value comparison process in FIG. 15, when CPU 201 determines in S220 that a content of an instruction from MFP 100 is not transmission of the set value to MFP 100 (or it is determined that an instruction to transmit the set value to MFP 100 is not stored in MFP 100), control returns to step S200.

As compared with the set value saving process in FIG. 7, in the set value comparison process in FIG. 15, CPU 201 transmits the set value to MFP 100 in step S230, and thereafter in step S232, it determines whether or not the set value has been set successfully. Such a determination is implemented, for example, based on a content (OK or NG) of the HTTP response transmitted from MFP 100. Then, when CPU 201 determines that the setting has been successful (YES in step S232), control proceeds to step S234. On the other hand, when CPU 201 determines that the setting has not been successful (has failed) (NO in step S232), control proceeds to step S250.

In step S234, CPU 201 deletes the setting saved in the Web Storage in step S202. Then, control proceeds to step S250.

<Flow of Operation Instruction Process (B)>

Figure 16:
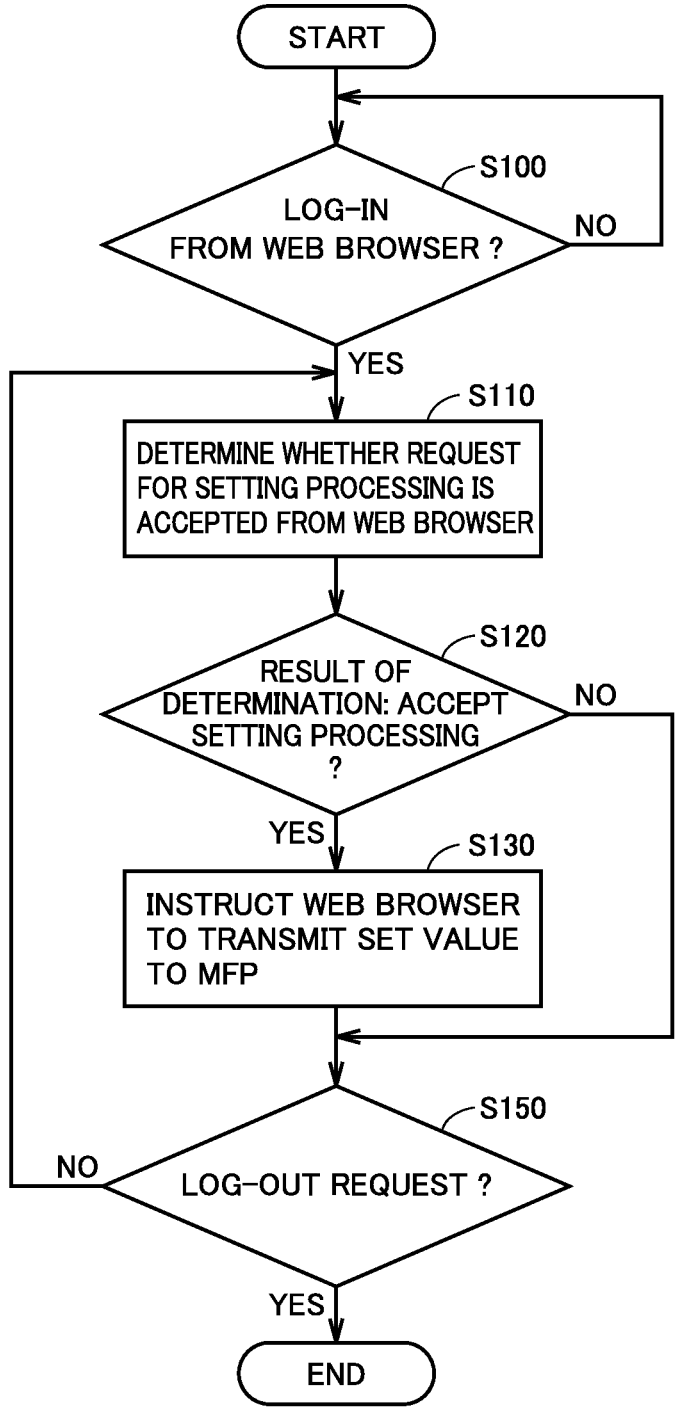
FIG. 16 is a flowchart of an operation instruction process (1B) performed in the MFP in the third embodiment.
Figure 17:
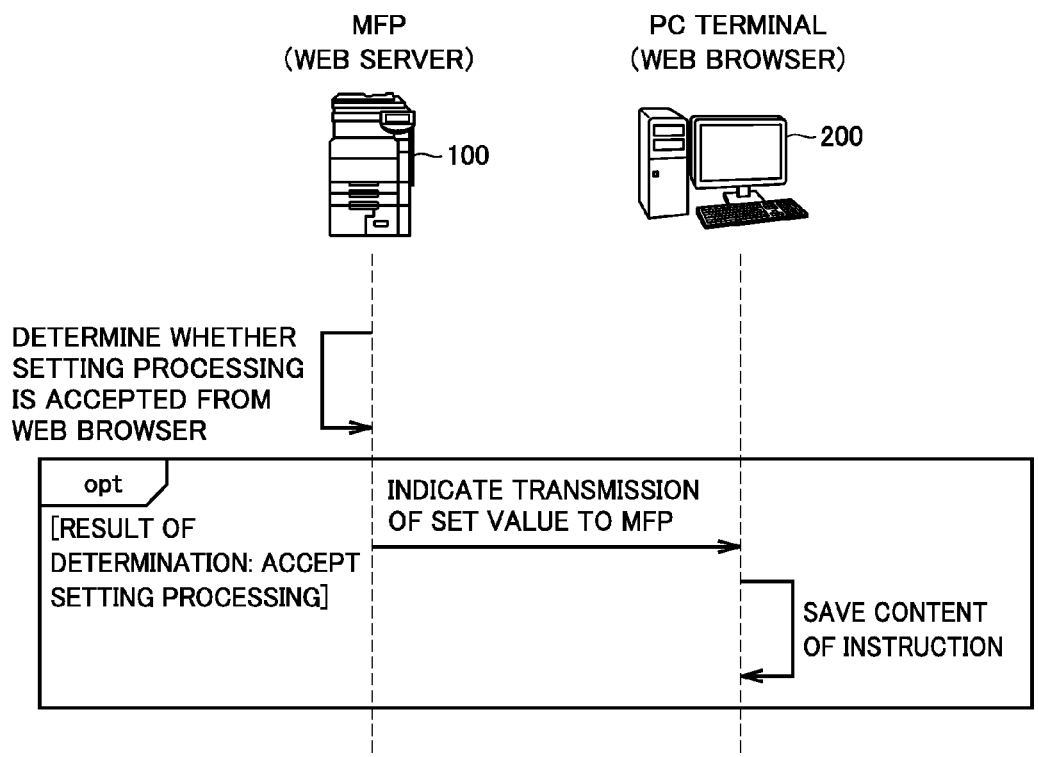
FIG. 17 is a diagram schematically showing contents in the operation instruction process (1B) in FIG. 16.

In the third embodiment, when MFP 100 is in the state that it does not accept setting processing, MFP 100 does not have to transmit an instruction to PC terminal 200. Thus, the "operation instruction process (1)" described with reference to FIGS. 5 and 6 in the first embodiment can be represented as in FIGS. 16 and 17 in the third embodiment as an "operation instruction process (1B)". FIG. 16 is a flowchart of the operation instruction process (1B) performed in MFP 100 in the third embodiment. FIG. 17 is a diagram schematically showing contents in the operation instruction process (1B) in FIG. 16.

As shown in FIGS. 16 and 17, in the operation instruction process (1B) in the third embodiment, when MFP 100 determines that MFP 100 is in the state that setting processing is accepted, MFP 100 instructs PC terminal 200 to save the set value. When it is determined that MFP 100 is not in the state that it accepts setting processing, however, it does not transmit an instruction to PC terminal 200.

More specifically, as shown in FIG. 16, in the operation instruction process (1B) in the third embodiment, when CPU 101 determines that a result of determination in step S120 indicates that MFP 100 is not in the state that it accepts setting processing, control proceeds to step S150 without an instruction for PC terminal 200 to save the set value.

The program according to the present disclosure may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present disclosure.

Alternatively, the program according to the present disclosure may be provided in a manner incorporated as a part of another program. In such a case as well, the program itself does not include the module included in another program, but the program executes the processing in cooperation with another program. Such a program incorporated in another program may also be encompassed in the program according to the present disclosure.

The provided program product is installed in a program storing portion such as a hard disk for execution. It is noted that the program product includes the program itself and a recording medium recording the program.

Though embodiments of the present invention have been described, it should be understood that the embodiments the examples disclosed herein are illustrative and non-restrictive in every respect. The scope of the present invention is defined by the terms of the claims and is intended to include any modifications within the scope and meaning equivalent to the terms of the claims.

What is claimed is:

1. An image processing apparatus containing a web server, said web server accepting setting processing of a set value for an operation of said image processing apparatus, comprising:
 a central processing unit configured to implement;
 a setting allowed/disallowed determination portion for determining whether said setting processing is to be accepted from a web browser;
 a setting operation instruction portion for instructing said web browser to save a set value input on said web browser on the web browser without allowing transmission of the set value to said image processing apparatus when said setting allowed/disallowed determination portion determines that said setting processing is not accepted and instructing said web browser to transmit said set value to said image processing apparatus when said setting allowed/disallowed determination portion determines that said setting processing is accepted;

a saved setting presence checking portion for checking whether there is a set value saved on said web browser;

a saved setting transmission instruction portion for instructing the web browser to transmit the set value saved on said web browser to said image processing apparatus; and a saved setting deletion instruction portion for instructing the web browser to delete the set value saved on said web browser, said setting operation instruction portion regularly notifying the web browser of an operation instruction, said saved setting presence checking portion checking whether there is a set value saved on the web browser when said setting allowed/disallowed determination portion determines that said setting processing is accepted, said saved setting transmission instruction portion having the web browser transmit the set value to said image processing apparatus when said saved setting presence checking portion confirms presence of the set value saved on the web browser, and said saved setting deletion instruction portion having the set value saved on the web browser deleted when the set value transmitted from said web browser is reflected on said image processing apparatus.

2. The image processing apparatus according to claim 1, further comprising:

a storage portion for storing the set value for the operation in said image processing apparatus;

two or more modules performing an operation associated with storage of the set value in said storage portion;

a central processing unit (CPU) for specifying, when said setting allowed/disallowed determination portion determines that said setting processing is not accepted, a module constituting a factor for the determination; and an auxiliary storage apparatus for storing information for specifying whether to have the web browser save the set value when each of said two or more modules has been specified as said factor, wherein when said setting allowed/disallowed determination portion determines that said setting processing is not accepted, said saved setting transmission instruction portion instructs the web browser to save the set value when the information stored in said auxiliary storage apparatus has specified an instruction for the web browser to save the set value for the module specified as said factor by said CPU, and does not instruct the web browser to save the set value when the information stored in said auxiliary storage apparatus has specified not instructing the web browser to save the set value for the module specified as said factor by said CPU.

3. The image processing apparatus according to claim 2, wherein said two or more modules include a first module accepting the set value transmitted from the web browser and a second module functioning as an interface of said storage portion for storing said set value accepted by said first module in said storage portion, and said auxiliary storage apparatus stores information specifying an instruction for the web browser to save the set value when the module specified as said factor is said first module, and information specifying not instructing the web browser to save the set value when the module specified as said factor is said second module.

4. The image processing apparatus according to claim 1, wherein said saved setting transmission instruction portion instructs the web browser to save the set value on the web browser regardless of a result of determination by said setting allowed/disallowed determination portion.

5. The image processing apparatus according to claim 1, further comprising a processor for controlling an operation of said image processing apparatus in a centralized manner, wherein said setting allowed/disallowed determination portion determines whether to accept said setting processing based on such a criterion as the number of processes being performed or to be performed in said image processing apparatus, a type of such a process, or a utilization factor of said processor.

6. A method of controlling an image processing apparatus containing a web server, said web server accepting setting processing of a set value for an operation of said image processing apparatus from a web browser, comprising the steps of:

determining whether to accept said setting processing;

regularly notifying said web browser of an operation instruction, said operation instruction indicating saving of the set value input on said web browser on the web browser without transmitting the set value to said image processing apparatus when it is determined that said setting processing is not accepted and indicating transmission of said set value to said image processing apparatus when it is determined that said setting processing is accepted;

checking whether there is a set value saved on said web browser when it is determined that said setting processing is accepted;

instructing the web browser to transmit the set value to said image processing apparatus when it is confirmed that there is a set value saved on said web browser; and indicating deletion of the set value saved on the web browser when the set value transmitted from said web browser is reflected on said image processing apparatus.

7. A non-transitory computer-readable storage medium storing a program for causing a computer of said image processing apparatus to perform the method according to claim 6.

8. An information processing apparatus containing a web browser, comprising:

a central processing unit configured to implement:

an acceptance portion accepting input of a set value for an operation of an image processing apparatus; and a setting allowed/disallowed checking portion for checking whether said image processing apparatus accepts setting processing of said set value;

a setting transmission portion for transmitting said set value to said image processing apparatus when said web browser receives instructions from said image processing apparatus;

a setting saving portion saving said set value on said web browser;

a saved setting presence checking portion checking whether there is a set value saved on said web browser; and a saved setting deletion portion deleting the set value saved on said web browser when said web browser receives a deletion instruction from said image processing apparatus;

said setting allowed/disallowed checking portion checking whether said image processing apparatus accepts said setting processing when the set value of which input has been accepted by said acceptance portion is transmitted to said image processing apparatus, wherein said setting saving portion saves said set value on said web browser without allowing said setting transmission portion to transmit the set value to said image processing apparatus when (i) a result of checking by said setting allowed/disallowed checking portion indicates not accepting said setting processing and (ii) when said web browser receives instructions from said image processing apparatus instructing said web browser to save said set value on said web browser without allowing transmission of the set value to said image processing apparatus, said setting transmission portion transmits said set value to said image processing apparatus (i) when the result of checking by said setting allowed/disallowed checking portion indicates acceptance of said setting processing, (ii) when said web browser receives instructions from said image processing apparatus instructing said web browser to transmit said set value to said image processing apparatus, and (iii) when said saved setting presence checking portion has confirmed saving of the set value, and said saved setting deletion portion deletes the set value saved on said web browser in response to receiving the deletion instruction from said image processing apparatus, said deletion instruction notifying said web browser of completion of setting of the set value from the image processing apparatus.

9. A method of controlling an information processing apparatus containing a web browser, comprising the steps of:

accepting input of a set value for an operation of an image processing apparatus;

checking whether said image processing apparatus accepts setting processing of said set value when said set value is transmitted to said image processing apparatus;

saving said set value on said web browser without transmitting the set value to said image processing apparatus (i) when a result of said checking indicates not accepting said setting processing and (ii) when said web browser receives instructions from said image processing apparatus instructing said web browser to save said set value on said web browser without allowing transmission of the set value to said image processing apparatus;

transmitting said set value to said image processing apparatus (i) when the result of said checking indicates acceptance of said setting processing and (ii) when said web browser receives instructions from said image processing apparatus instructing said web browser to transmit said set value to said image processing apparatus; and deleting the set value saved on said web browser in response to receiving a deletion instruction from said image processing apparatus, said deletion instruction notifying said web browser of completion of setting of transmitted said set value from said image processing apparatus.

10. A non-transitory computer-readable storage medium storing a program for causing a computer of said image processing apparatus to perform the method according to claim 9.

* * * * *